United States Patent [19]
Sasaki et al.

[11] Patent Number: 5,558,296
[45] Date of Patent: Sep. 24, 1996

[54] METHOD OF SUCCESSIVELY WINDING AN ELONGATED MEMBER AND AN APPARATUS THEREFOR

[75] Inventors: Kouji Sasaki; Kazuji Kaneda, both of Ichihara, Japan

[73] Assignee: The Furukawa Electric Co., Ltd., Tokyo, Japan

[21] Appl. No.: 267,447

[22] Filed: Jun. 28, 1994

[30] Foreign Application Priority Data

Jun. 30, 1993 [JP] Japan .................................. 5-187584

[51] Int. Cl.$^6$ .................... B65H 54/00; B65H 67/044
[52] U.S. Cl. ............... 242/18 A; 242/18 G; 242/18 A; 242/18 PW
[58] Field of Search ........................... 242/25 A, 25 R, 242/18 A, 18 G, 18 PW

[56] References Cited

U.S. PATENT DOCUMENTS

| | | | |
|---|---|---|---|
| 3,695,528 | 10/1972 | Taki et al. | 242/25 A |
| 3,698,652 | 10/1972 | Morikawa et al. | 242/25 A |
| 3,913,858 | 10/1975 | Ikegami | 242/25 A |
| 4,015,785 | 4/1977 | Ikegami et al. | 242/25 A |
| 4,203,559 | 5/1980 | Coggin, Jr. et al. | 242/18 G |
| 4,557,423 | 12/1985 | Zingler | 242/25 A X |
| 4,618,104 | 10/1986 | Harris | 242/18 G |
| 4,792,100 | 12/1988 | Pepe | 242/25 A |

FOREIGN PATENT DOCUMENTS 4-246068  9/1992  Japan .

Primary Examiner—Michael R. Manson
Attorney, Agent, or Firm—Pearne, Gordon, McCoy & Granger

[57] ABSTRACT

An apparatus for successively winding an elongated member comprising a pair of pinch rolls disposed between two spoolers to pinch the elongated member to be transferred from one of the two spoolers on which the elongated member is being wound to the other spooler while the elongated member is prevented by the pinch rolls from being adversely affected by a tension applied to the elongated member when it is caught and cut by a catching member on the other spooler.

14 Claims, 30 Drawing Sheets

METHOD OF SUCCESSIVELY WINDING AN ELONGATED MEMBER AND AN APPARATUS THEREFOR

BACKGROUND OF THE INVENTION

This invention pertains to a method and an apparatus for alternately and successively winding on spools of a double-spooler type winder an elongated member such as optical fiber which tends to be cut when it is subject to a tension which is produced by catching and cutting the elongated member on a waiting spooler on which it begins to be wound from now on although the elongated member to be wound is not limited to a fine member such as optical fiber. Thus, it should be understood that the method and the apparatus of the invention may be applied to a thick elongated member such as an electric wire or the likes.

In general, as shown in FIG. 39, such an apparatus for successively winding an elongated member comprises two spoolers 10 and 10' having spools 12 and 12' mounted thereon, respectively and elongated member transferring means 30 serving to transfer an elongated member 1 from one spooler (operating spooler) 10 on which the elongated member 1 is being now wound to the other vacant spooler (waiting spooler) 10' after the operating spooler 10 is nearly full of the elongated member 1. The elongated member transferring means 30 comprises an elongated member shifting section 32 including a guide pulley to shift the elongated member 1 from the operating spooler 10 to the waiting spooler 10' when the elongated member 1 is to be transferred, catching members 28 and 28' having catching pawls 26 and 26' provided on the spoolers 10 and 10' respectively, to catch a wind-beginning end of the elongated member 1 which is to be wound on the waiting spooler 10' (or 10) from now on and an elongated member drawing section 34 to draw the elongated member 1 toward the catching member 28' (or 28) on the waiting spooler 10' (or 10) when the elongated member 1 is transferred from the operating spooler 10 (or 10') to the waiting spooler 10' (or 10).

In operation, the elongated member 1 is being wound on the spool 12 on the operating spooler 10 and when the spool 12 on the operating spooler 10 is nearly full of the elongated member 1, the elongated member shifting section 32 moves the guide pulley so as to shift the elongated member 1 from an operating position below which the spool 12 on the operating spooler 10 is located to a waiting position below which the spool 12' on the waiting spooler 10' is located (see FIG. 2). Thus, as noted from this figure, the elongated member 1 is positioned so as to cross the spool 12' on the waiting spooler 10'.

Thereafter, the elongated member drawing section 34 draws the elongated member 1 until it engages the catching member 28' on the spool 12' which is now rotated by an operation of the waiting spooler 10' whereby it is caught by the catching pawl 26' on the catching member 28' while it is securely held between the spools 12 and 12'. Thus, the elongated member 1 is cut between the spools 12 and 12' by the rotation of the spool 12' and the succeeding elongated member 1 extending from the portion (the wind-beginning end) of the elongated member 1 which is securely held by the spool 12' begins to be wound on the spool 12' on the spooler 10' which is now operated.

Since the elongated member 1 is securely and directly held between the spools 12 and 12' and the spooler 10 is still operated, the wound layers of the elongated member 1 on the spool 12 will be adversely affected by an excessive tension applied to the elongated member 1 when it is caught and cut by the catching member 28'. In order to avoid this, the spools 12 and 12' have wasteful spool portions 12A and 12'A provided on one side thereof. The elongated member 1 is wound on the wasteful spool portion 12A of the spool 12 after it is fully wound thereon and then it is drawn by the elongated member drawing section 34. Therefore, the tension produced when the elongated member 1 is caught and cut between the spools 12 and 12' is never directly applied to the wound layers of the elongated member 1 on the main body of the spool 12 because the wasteful spool portion 12A interrupts the tension from being applied to the wound layers on the main body of the spool 12. The spooler 10 which has a fully wound layers on the spool 12 stops after the wind-terminating end of the elongated member 1 which is formed by being cut away from the wind-beginning portion thereof caught by the spool 12' on the spooler 10' is introduced into and wound on the spool 12 on the spooler 10.

However, when the elongated member 1 is transferred from the main body of the spool 12 (or 12') to the wasteful spool 12A (or 12'A) beyond the flange thereof, the line speed of the elongated member 1 will sharply vary. Since a dancer disposed on an upstream side of the apparatus cannot follow sharp variation in the line speed, the elongated member 1 will be damaged or broken and therefore it fails to be often transferred to the waiting spooler 12' or 12.

This will remarkably happen particularly when the elongated member 1 is wound at higher line speed and therefore the high speed operation of the apparatus disadvantageously cannot be made. In addition thereto, since the elongated member 1 on the wasteful spool portion 12A (or 12'A) has to be removed therefrom, the operation of the apparatus is ineffectively made. This prevents the spool from being automatically mounted on the corresponding spooler or removed therefrom.

Since the elongated member 1 is only engaged with and caught by the catching pawl 26 (or 26') on the catching member 28 (or 28') when it is transferred, it cannot be caught in a stable manner on the spool on the waiting spooler. Thus, the elongated member will fail to be positively transferred.

Japanese Patent Application Laying-Open No. 246068/1992 (4-246668) discloses an apparatus for successively winding an elongated member comprising pulling rollers disposed between two spoolers to pull the elongated member and suction nozzles disposed between the pulling rollers and the respective spoolers, respectively to suck therein the wind-terminating portion of the elongated member which is wound on the operating spooler until now.

Since the disclosed apparatus stops the spooler operated until now and thereafter sucks into the corresponding suction nozzle the succeeding excessive portion of the elongated member to be wound on the operating spooler when it is nearly full of the elongated member, the wound layers on the spool on the operating spooler will be never affected by the tension produced when the elongated member is caught and cut at the waiting spooler although the elongated member extends between the two spoolers.

However, in this disclosed apparatus, since the portion of the elongated member sucked in the suction nozzle at the corresponding spooler has to be wound by the corresponding spooler slowly again operated, the operation of the apparatus will be ineffectively made and also the suction nozzles and vacuum system to be connected thereto cause the equipment robe expensive.

SUMMARY OF THE INVENTION

It is a principal object of the invention to provide a method of successively winding an elongated member adapted to transfer it from one spooler to another spooler without wastefully winding it.

It is another object of the invention to provide a method of successively winding an elongated member adapted to transfer it from one spooler to another spooler without any damage or breakage of the elongated member.

It is a further object of the invention to provide a method of successively winding an elongated member adapted to transfer it from one spooler to another spooler without any troublesome operation of the operating side spooler.

It is a further object of the invention to provide a method of successively winding an elongated member having no expensive equipment provided therein.

It is a further object of the invention to provide an apparatus for successively winding an elongated member adapted to transfer it from one spooler to another spooler without wastefully winding it.

It is a further object of the invention to provide an apparatus for successively winding an elongated member adapted to transfer it from one spooler to another spooler without any damage or breakage of the elongated member.

It is a further object of the invention to provide an apparatus of successively winding an elongated member adapted to transfer it from one spooler to another spooler without any troublesome operation of the operating side spooler.

It is a further object of the invention to provide an apparatus for successively winding an elongated member having no expensive equipment provided therein.

In accordance with an aspect of the present invention, there is provided a method of successively winding an elongated member comprising the steps of shifting said elongated member to be transferred from a spool on one of at least two spoolers to a spool on the other spooler; drawing said elongated member toward a catching member on said spool on said other spooler to catch a wind-beginning end of said elongated member whereby said elongated member is transferred from said one spooler to said other spooler; and stopping said one spooler after said elongated member is caught and cut by said catching member on said spool on said other spooler and a wind-terminating portion of said elongated member cut away from said wind-beginning end thereof is wound on said spool on said one spooler; said method characterized by further comprising the step of pinching said elongated member to be transferred between said two spoolers so that a tension applied to said elongated member when said elongated member is caught and cut at said other spooler is prevented from being applied to said elongated member on said spool on said one spooler.

In accordance with another aspect of the present invention, there is provided a method of successively winding an elongated member comprising the steps of shifting said elongated member to be transferred from a spool on one of at least two spoolers to a spool on the other spooler; drawing said elongated member toward a catching member on said spool on said other spooler to catch a wind-beginning end of said elongated member whereby said elongated member is transferred from said one spooler to said other spooler; and stopping said one spooler after said elongated member is caught and cut by said catching member on said spool on said other spooler and a wind-terminating portion of said elongated member cut away from said wind-beginning end thereof is wound on said spool on said one spooler; said method characterized by further comprising the steps of pinching said elongated member to be transferred between said two spoolers so that a tension applied to said elongated member when said elongated member is caught and cut at said other spooler is prevented from being applied to said elongated member on said spool on said one spooler; pulling out said elongated member at a speed higher than a winding speed of said one spooler while said elongated member is pinched so that is is slackened on the downstream side of said pinched elongated member; and absorbing a slack of said elongated member so that an appropriate tension is applied to said elongated member on said downstream side thereof.

In accordance with further aspect of the invention, there is provided a method of successively winding an elongated member comprising the steps of shifting said elongated member to be transferred from a spool on one of at least two spoolers to a spool on the other spooler; drawing said elongated member toward a catching member on said spool on said other spooler to catch a wind-beginning end of said elongated member whereby said elongated member is transferred from said one spooler to said other spooler; and stopping said one spooler after said elongated member is caught and cut by said catching member on said spool on said other spooler and a wind-terminating portion of said elongated member cut away from said wind-beginning end thereof is wound on said spool on said one spooler; said method characterized by further comprising the steps of pinching said elongated member to be transferred between said two spoolers so that a tension applied to said elongated member when said elongated member is caught and cut at said other spooler is prevented from being applied to said elongated member on said spool on said one spooler; and accumulating said elongated member between a pinched portion thereof and said other spooler.

In accordance with further aspect of the present invention, there is provided an apparatus for successively winding an elongated member comprising at least two spoolers, one of which is operated for winding said elongated member while other vacant spooler is prepared for successively winding said elongated member after it is transferred from said one spooler, said one spooler adapted to stop after said elongated member is caught and cut at said other spooler and a wind-terminating portion of said elongated member is wound on said spool on said one spooler; and elongated member transferring means serving to transfer said elongated member from said one spooler to said other spooler; said elongated member transferring means comprising an elongated member shifting section to shift said elongated member from said one spooler to said other spooler when said elongated member is to be transferred, catching members provided on said spoolers, respectively to catch a wind-beginning end of said elongated member which begins to be wound on said other spooler and from which said wind-terminating portion thereof is cut away and an elongated member drawing section t,o draw said elongated member toward said catching member on said other spooler when said elongated member is transferred; said elongated member transferring means characterized by further comprising an elongated member pinching section to pinch said elongated member when it is transferred between said spoolers so that a tension applied to said elongated member when said elongated member is caught and cut at said other spooler is prevented from being applied to said elongated member on said spool on said one spooler.

In accordance with further aspect of the invention, there is provided an apparatus for successively winding an elongated member comprising at least two spoolers, one of which is operated for winding said elongated member while other vacant spooler is prepared for successively winding said elongated member after it is transferred from said one spooler, said one spooler adapted to stop after said elongated member is caught and cut at said other spooler and a wind-terminating portion of said elongated member is wound on said spool on said one spooler; and elongated member transferring means serving to transfer said elongated member from said one spooler to said other spooler; said elongated member transferring means comprising an elongated member shifting section to shift said elongated member from said one spooler to said other spooler when said elongated member is to be transferred, catching members provided on said spoolers, respectively to catch a wind-beginning end of said elongated member which begins to be wound on said other spooler and from which said wind-terminating portion thereof is cut away and an elongated member drawing section to draw said elongated member toward said catching member on said other spooler when said elongated member is transferred; said elongated member transferring means characterized by further comprising an elongated member pinching section to pinch said elongated member when it is transferred between said spoolers so that a tension applied to said elongated member when said elongated member is caught and cut at said other spooler is prevented from being applied to said elongated member on said spool on said one spooler; and an accumulator disposed between said elongated member pinching section and said other spooler so that said elongated member is accumulated therebetween.

In accordance with further aspect of the invention, there is provided an apparatus for successively winding an elongated member comprising at least two spoolers, one of which is operated for winding said elongated member while other vacant spooler is prepared for successively winding said elongated member after it is transferred from said one spooler, said one spooler adapted to stop after said elongated member is caught and cut at said other spooler and a wind,terminating portion of said elongated member is wound on said spool on said one spooler; and elongated member transferring means serving to transfer said elongated member from said one spooler to said other spooler; said elongated member transferring means comprising an elongated member shifting section to shift said elongated member from said one spooler to said other spooler when said elongated member is to be transferred, catching members provided on said spoolers, respectively to catch a wind-beginning end of said elongated member which begins to be wound on said other spooler and from which said wind-terminating portion of said elongated member is wound on said spool on said one spooler; and an elongated member drawing section to draw said elongated member toward said catching member on said other spooler when said elongated member is transferred; said elongated member transferring means characterized by further comprising an accumulator disposed between said elongated member pinching section and said other spooler so that said elongated member is accumulated therebetween.

Since the elongated member is pinched between one of two spoolers (operating spooler) and another spooler (waiting spooler) when the elongated member is to be transferred from the operating spooler to the waiting spooler, a tension produced when the elongated member is caught and cut at the waiting spooler is never applied to the wound layers on a spool on the operating spooler. This advantageously causes the elongated member to be transferred without being wastefully wound on the spool on the operating spooler. Also, since the elongated member wily have no sharp line speed variation because of no wasteful winding thereof, it will be advantageously wound at higher line speed, which causes the operation of the apparatus to be more effectively made.

Since the elongated member is transferred while it is accumulated between the two spoolers, the elongated member will be positively and stably caught by the catching member because of its catching force being more improved.

Since the wind-terminating portion of the elongated member can be directly wound on the operating spooler, the operation of the apparatus is effectively made.

Since no equipments such as suction nozzles and vacuum systems connected thereto are required, the construction of the apparatus is simplified and inexpensive.

BRIEF DESCRIPTION OF THE DRAWINGS

The above and other objects and features of the invention will be apparent from the detailed description of the embodiment taken along with reference to the accompanying drawings, in which.

DETAILED DESCRIPTION OF THE EMBODIMENT

Figure 1:
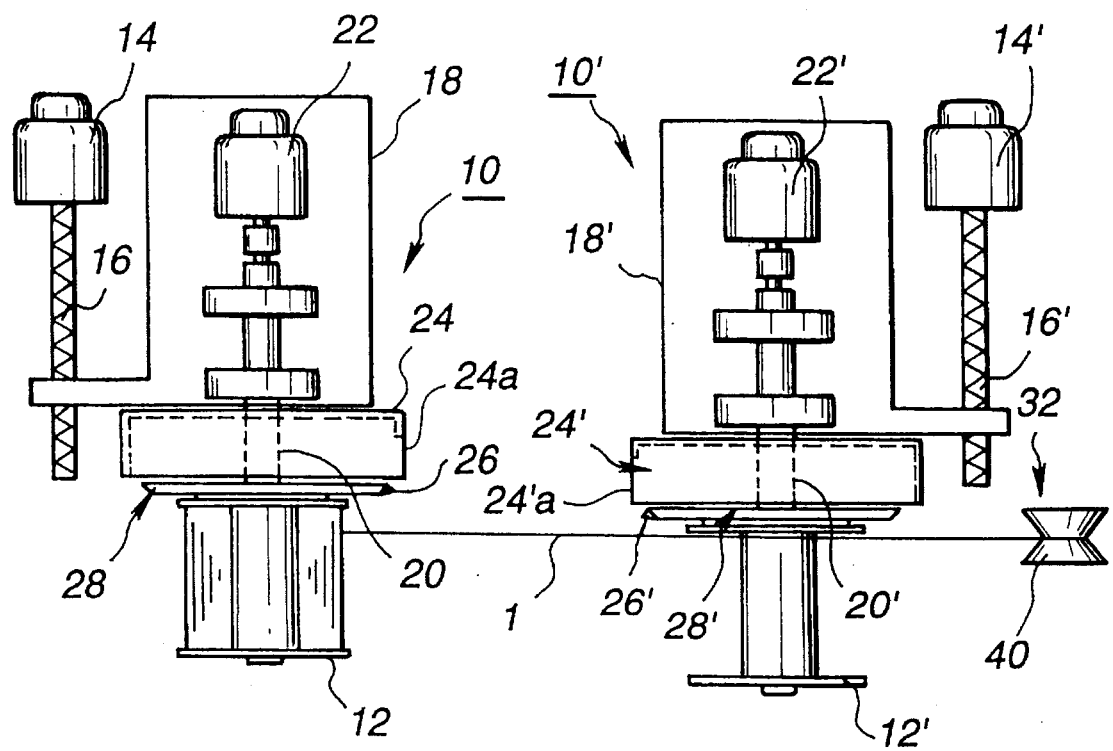
FIG. 1 schematically illustrates in a plan view a first step of a method of the invention together with an apparatus for carrying out it.

Referring now to the drawings, FIGS. 1 through 14 schematically illustrate a method of successively winding an elongated member in accordance with the invention. An elongated member 1 such as optical fiber, electric wire or the like is alternately and successively wound on two spoolers 10 and 10'. In FIGS. 1 through 14, the elongated member 1 is shown to be nearly fully wound on a spool 12 on the spooler 10 and being transferred onto a spool 12' on the spooler 10' therefrom.

The spoolers 10 and 10' comprise movable frames 18 and 18' axially traversing by means of screws 16 and 16' which are driven by traversing motors 14 and 14'respectively, winding shafts 20 and 20' rotatably mounted on the respective movable frames 18 and 18' to hold the spools 12 and 12' and drive motors 22 and 22' which drive the winding shafts 20 and 20', respectively.

In the illustrated embodiment, there are provided end covers 24 and 24' slidably movable in a forward or backward direction on the winding shafts 20 and 20', respectively to surround the spools 12 and 12' so that wind-terminating portions of the elongated member 1 on the spools 12 and 12' are prevented from moving widely around the spoolers 10 and 10' due to their centrifugal force. The end covers 24 and 24' have notch-like openings 24a and 24'a through which the elongated member 1 extends and is introduced into and out of the end covers 24 and 24'. The end covers 24 and 24' may be slidably moved by not shown cover movement means.

On the winding shafts 20 and 20' are integrally provided disk-like catching members 28 and 28' which have catching pawls 26 and 26' provided thereon, respectively. The elongated member 1 is wound on the respective spools 12 and 12', respectively while its wind-beginning end is caught by the respective catching pawls 26 and 26'.

The elongated member 1 is transferred from the spooler 10 or 10' to the spooler 10' or 10 by elongated member transferring means 30. The elongated member transferring means 30 comprises an elongated member shifting section 32 serving to shift the elongated member 1 from the spool 12 or 12' on the spooler 10 or 10' to the spool 12' or 12 on the spooler 10' or 10 when the elongated member is to be transferred, an elongated member drawing section 34 (see FIGS. 11 and 12) to draw the elongated member 1 toward the catching member 28' or 28 on the spooler 10' or 10 when the elongated member 1 is to be transferred, an elongated member pinching section 36 (see FIGS. 3 through 7) to pinch the elongated member 1 when it is to be transferred between the spooler 10 and 10' and accumulators 38 and 38' (see FIGS. 7 through 14) disposed between the elongated member pinching section 36 and the spoolers 10 and 10', respectively to accumulate the elongated member 1.

Although there is shown no accumulator 38 in these figures, this accumulator 38 is advanced from a waiting position to an accumulating position where the elongated member 1 is accumulated when it is to be transferred from the spooler 10' to the spooler 10 after the elongated member 1 is fully wound on the spooler 10'.

Figure 2:
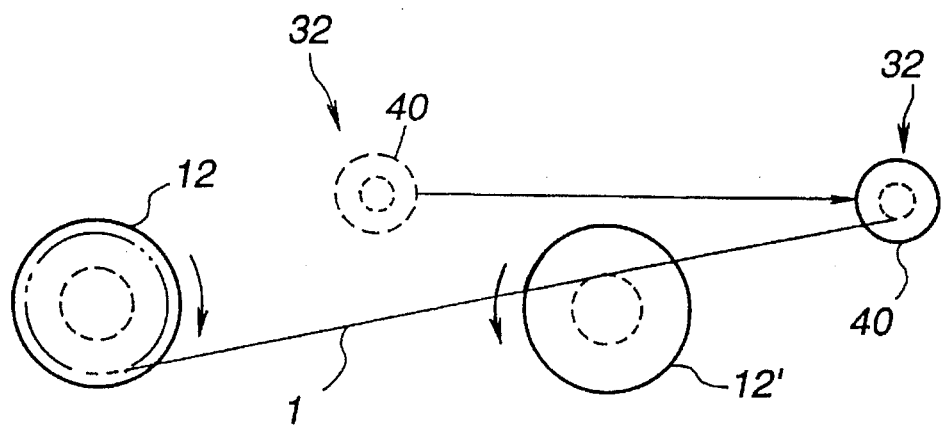
FIG. 2 schematically illustrates in a side elevational view the first step of the method of the invention shown in FIG. 1.

In the illustrated embodiment, the elongated shifting section 32 comprises a guide pulley 40 to guide the elongated member 1 to the spooler 10 or 10'. As shown in FIG. 2, the guide pulley 40 moves from a dotted line position (a leftward position of FIG. 2) where the elongated member 1 is guided to the spool 12 on the spooler 10 to a solid line position (a rightward position of FIG. 2) where the elongated member 1 is guided to the spool 12' on the spooler 10' whereby the elongated member 1 is shifted between the spoolers 10 and 10'.

Figure 11:
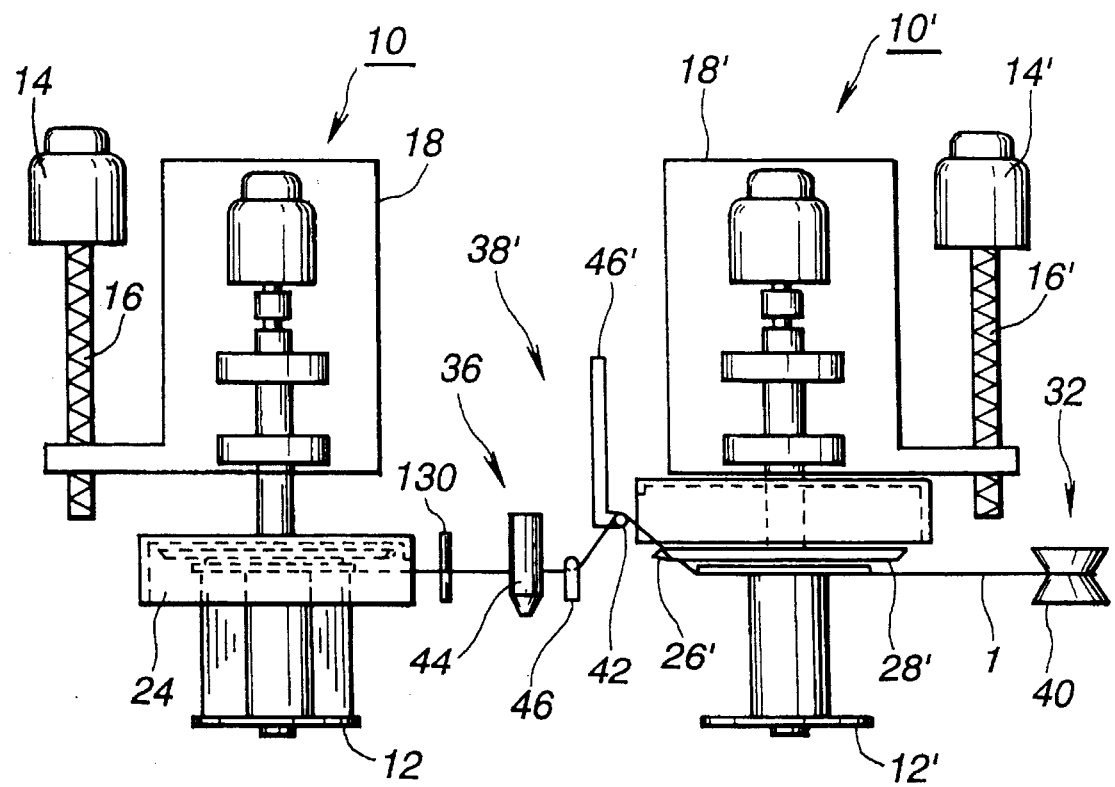
FIG. 11 schematically illustrates in a plan view a sixth step of the method of the invention.

As shown in FIGS. 9, 11 through 14, the elongated member drawing section 34 comprises a drawing rod 42 disposed between the accumulator 38' or 38 and the spooler 10' or 10 having the vacant spool 12' or 12, respectively to draw the elongated member 1 toward the catching pawl 26' or 26 on the catching member 28' or 28 on the spooler 10' or 10 (see FIG. 11). In the illustrated embodiment, the drawing rod 42 is provided integrally with an accumulator rod 46' described later.

Figure 3:
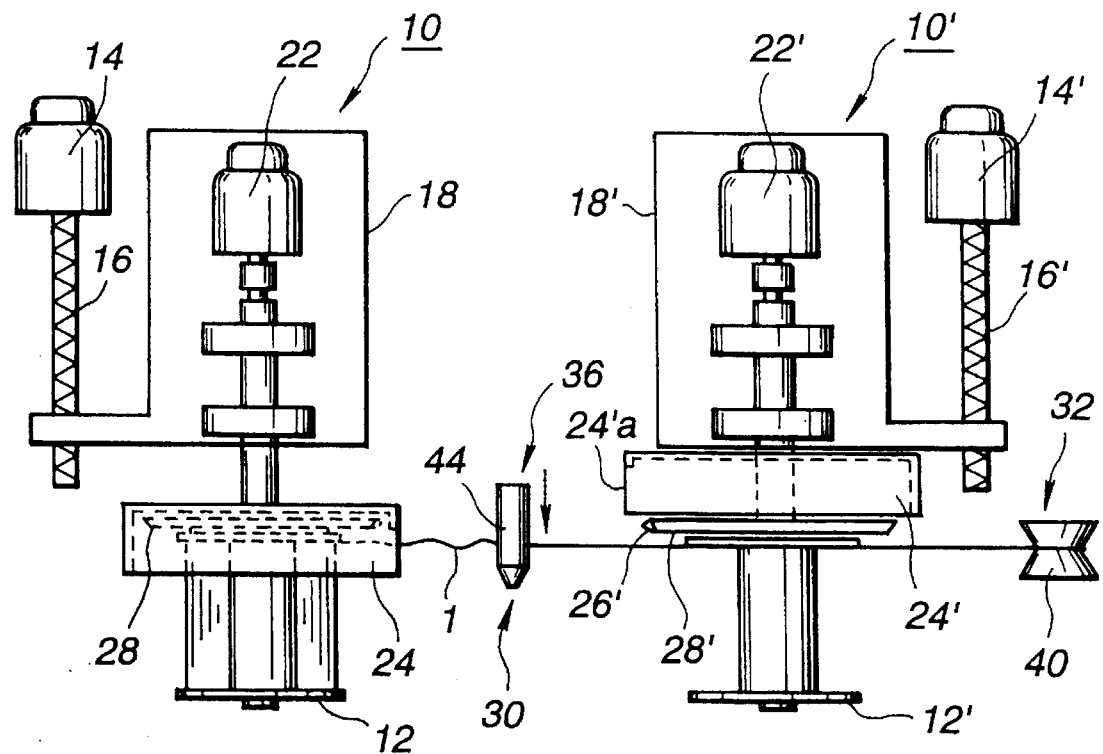
FIG. 3 schematically illustrates in a plan view a second step of the method of the invention.
Figure 8:
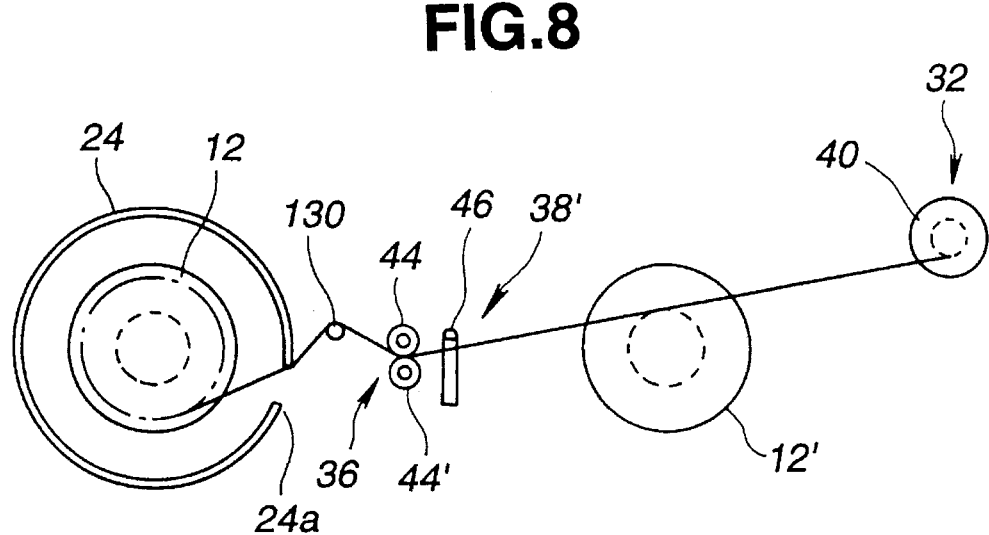
FIG. 8 schematically illustrates in a side elevational view the fourth step of the method of the invention shown in FIG. 7.
Figure 15A:
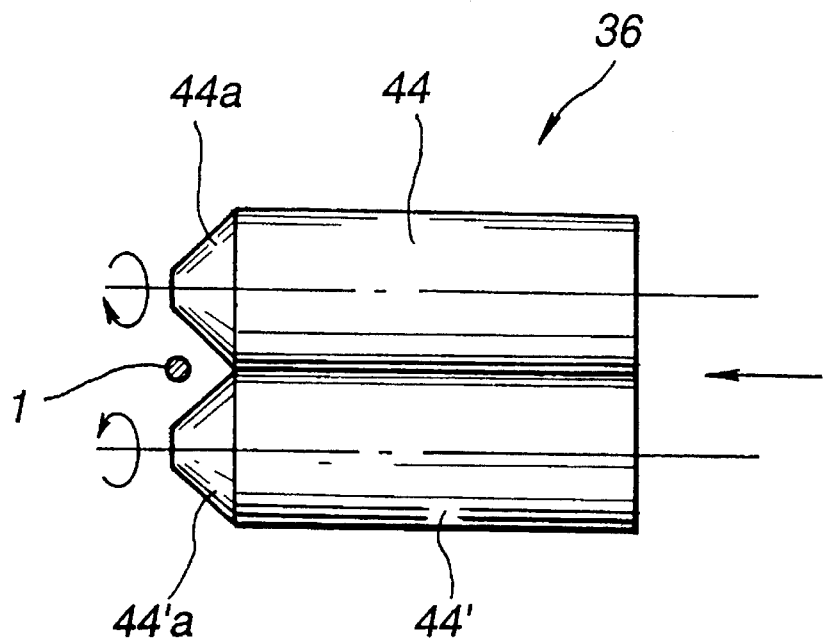
FIG. 15A illustrates in enlarged and side elevational view an elongated member pinching section used for the invention just before the elongated member is pinched thereby.
Figure 15B:
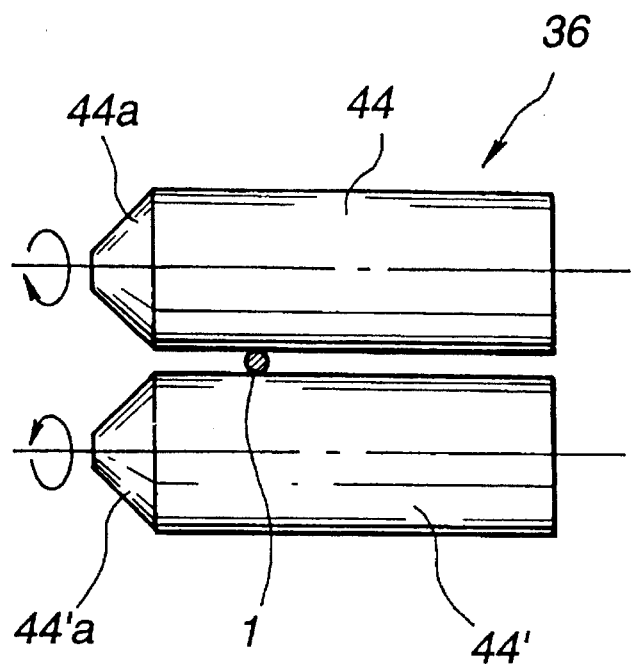
FIG. 15B illustrates in enlarged and side elevational view an elongated member pinching section used for the invention when the elongated member is pinched thereby.

The elongated member pinching section 36 comprises a pair of pressure rolls 44 and 44' in the form of pinch roll which move between an elongated member transferring position of FIGS. 1, 3 and 8 and a position where it is withdrawn from the elongated member transferring position. As shown in FIGS. 15A and 15B, the pressure rolls 44 and 44' have tapered portions 44a and 44'a provided on their ends so as to easily insert the elongated member 1 between the pressure rolls 44 and 44'. Thus, as the pressure rolls 44 and 44' are advanced to the elongated member pinching position, the elongated member 1 is inserted and pinched between the pressure rolls 44 and 44' while it widens the space between the pressure rolls 44 and 44' along their tapered portions 44a and 44'a. It will be noted that the pressure rolls 44 and 44' are urged toward each other by not shown spring or the like to serve to pinch the elongated member 1 from upper and lower sides thereof.

Figure 4:
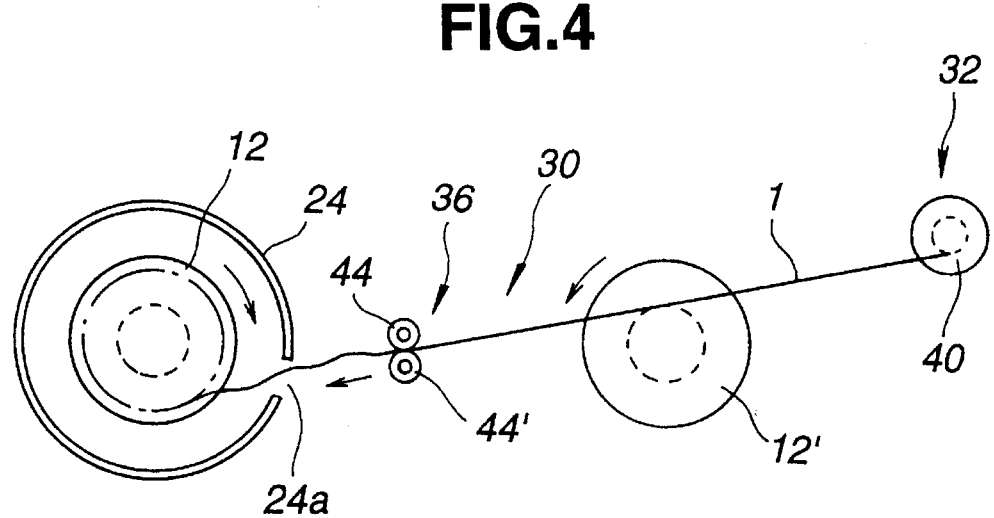
FIG. 4 schematically illustrates in a side elevational view the second step of the method of the invention shown FIG. 3.

Although, in the illustrated embodiment, the pressure rolls 44 and 44' are rotatably driven by not shown rotary drive source, one of the pressure rolls 44 and 44' may be rotatably driven while the other pressure roll may follow the thus driven pressure roll. A peripheral velocity (Vb) of the pressure rolls 44 and 44' and a winding speed (Vw) of the elongated member 1 are so set to be $Vb \geq Vw$. Thus, the elongated member 1 is slackened as shown in FIGS. 3 and 4 after it is pinched between and driven by the pressure rolls 44 and 44' and therefore it is never affected by a tension applied to the elongated member 1 from an upstream side of the pressure rolls 44 and 44'.

As shown in FIGS. 7 through 14, the accumulator 38' comprises upper and lower accumulator rods 46 and 46' being forced on the elongated member 1 from upper and lower sides thereof so that it is accumulated while deformed in the form of wave between the elongated member pinching section 36 and the spool 12' on which the elongated member 1 begins to be wound. It will be understood that the accumulator 38 which is disposed between the elongated member pinching section 36 and the spool 12 is constructed in the same manner.

In the same manner as the elongated member pinching section 36 move, the accumulator rods 46 and 46' move between an elongated member transferring position of FIGS. 1, 3 and 8 and a position where it is withdrawn from the elongated member transferring position.

As shown in FIGS. 8, 10, 12 and 14, the upper and lower accumulator rods 46 and 46' can move between a non-accumulation position where they are far away without any accumulation of the elongated member 1 and an accumulation position of FIGS. 8, 10, 12 and 14 where they are located at reverse positions relative to the elongated member 1 so as to accumulate it while it is resiliently urged by them.

As shown in FIGS. 6, 8, 10, 12 and 14, the elongated member transferring means 30 further comprises a looper 130 disposed between the elongated member pinching section 36 and the spooler 10 or 10' to absorb the slack of the elongated member 1 which is produced by the peripheral velocity of the pressure rolls 44 and 44' higher than the winding speed of the elongated member 1.

A method of the invention will be described with reference to FIGS. 1 through 14 hereinjustbelow. Succeeding odd-numbered and even-numbered figures such as FIGS. 1 and 2, 3 and 4, 5 and 6, 7 and 8, 9 and 10, 11 and 12, 13 and 14 illustrate the same condition or step of the method of the invention, respectively.

As shown in FIGS. 1 and 2, as the spool 12 on the one spooler (operating spooler) 10 has the elongated member 1 nearly fully wound thereon, the spool 12' on the other spooler (waiting spooler) 10' is advanced so that the elongated member 1 approaches the drive side flange of the spool 12'. The guide pulley 40 of the elongated member shifting section 32 moves from the dotted line position of FIG. 2 to the solid line position thereof. Thus, as noted from FIG. 1, the elongated member 1 is positioned on the inside of the drive side flange of the spool 12' on the other spooler Thereafter, as shown in FIGS. 3 and 4, after the operating spooler 10 is advanced so that the elongated member 1 is positioned on the inside of the drive side flange of the spool 12 on the spooler 10, the end cover 24 is advanced by not shown cover movement means so as to surround the drive side flange of the spool 12 on the spooler 10 and the wound layers of the elongated member 1 positioned on the inside thereof.

On the other hand, the vacant spool 12' on the waiting spooler 10' begins to rotate so that a peripheral velocity of a drum of the spool 12' is identical to a line speed of the elongated member 1 (a winding speed of the spooler 10'). Since the elongated member 1 is not still securely held on the spool 12', it is never wound thereon.

The pressure rolls 44 and 44' of the elongated member pinching section 36 are advanced to a position where they pinch the elongated member 1. As noted from FIG. 15, the elongated member 1 is inserted and pinched between the pressure rolls 44 and 44' as they are advanced from a position of FIG. 15A to a position of FIG. 15B. As aforementioned, since the peripheral velocity of the pressure rolls 44 and 44' is higher than the line speed of the elongated member 1, a downstream portion of the elongated member 1 relative to the pressure rolls 44 and 44' is slackened as shown in FIGS. 3 and 4. It should be understood that the pressure rolls 44 and 44' serve to interrupt the upperstream side tension produced when the elongated member 1 is caught and cut at the waiting spooler 10' as described later from being applied to the downstream portion of the elongated member 1. As noted from FIGS. 3 and 4, the elongated member 1 is introduced out of the end cover 24 through the notch-like opening 24a.

Figure 5:
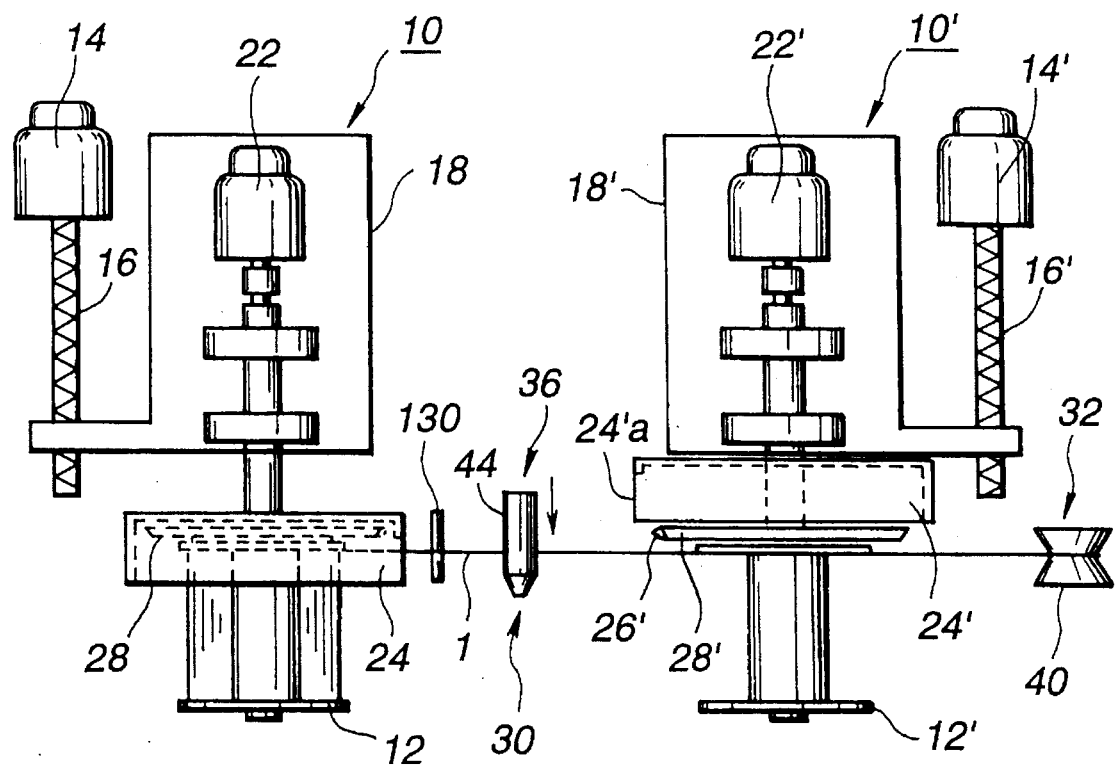
FIG. 5 schematically illustrates in a plan view a third step of the method of the invention.
Figure 6:
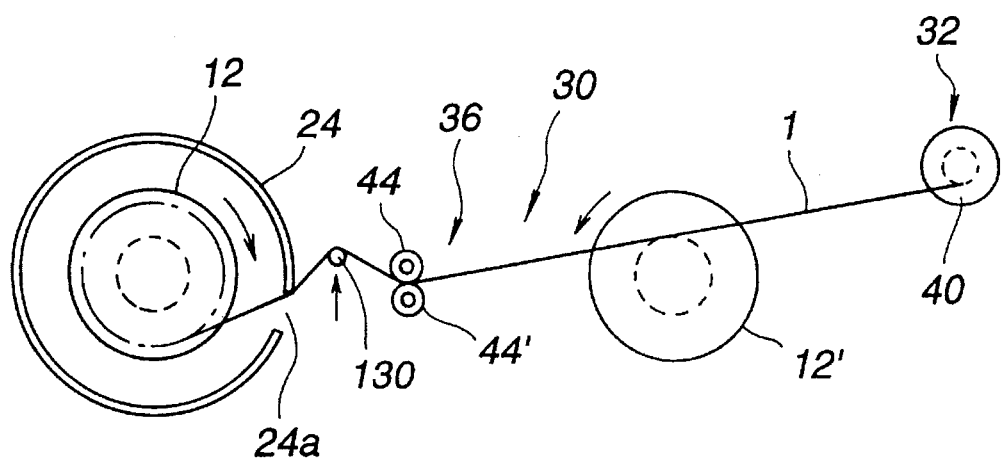
FIG. 6 schematically illustrates in a side elevational view the third step of the method of the invention shown in FIG. 5.

Thereafter, as shown in FIGS. 5 and 6, the looper 130 moves upwardly while it scoops the elongated member 1 between the spooler 10 and the pressure rolls 44 and 44' so that the slackened portion of the elongated member 1 is absorbed and an appropriate tension is applied thereto. As described later in detail with reference to the embodiment of the invention, a position of the looper 130 is electrically detected so that the rotary speed (winding speed) of the spooler 12 and the peripheral velocity of the pressure rolls 44 and 44' are so adjusted as to set an appropriate tension of the downstream portion of the elongated member 1 until the elongated member 1 is fully shifted.

Figure 7:
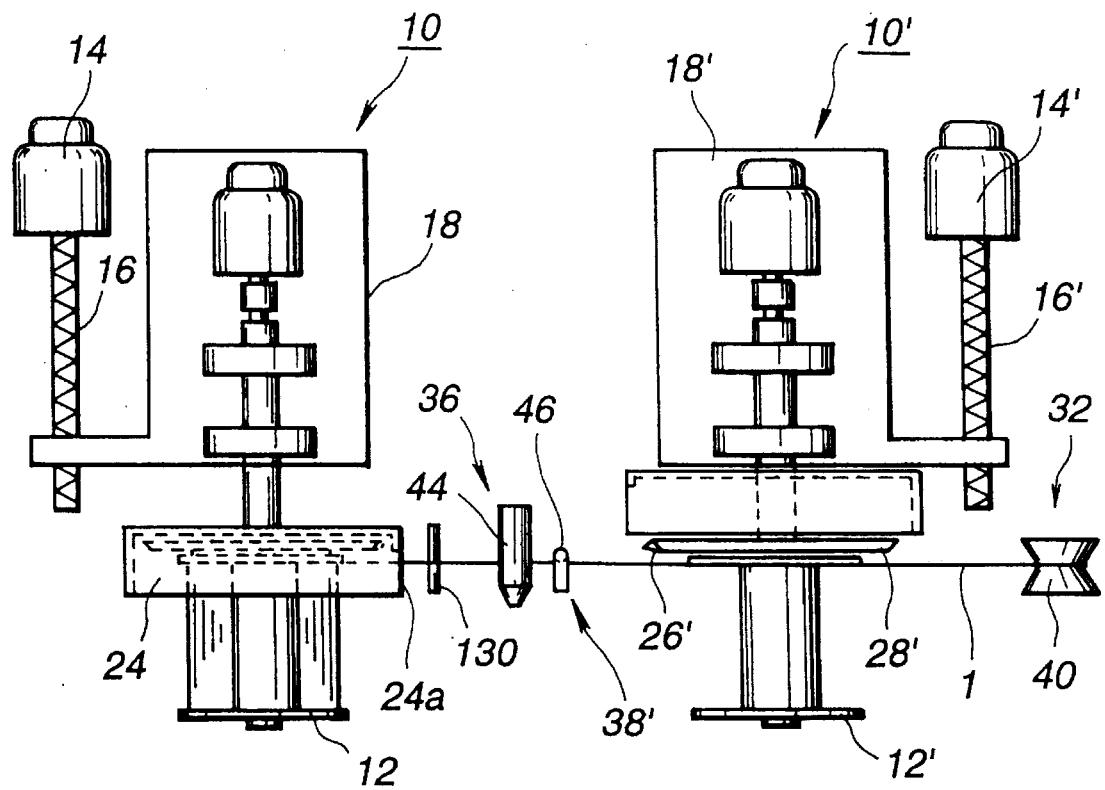
FIG. 7 schematically illustrates in a plan view a fourth step of the method of the invention.
Figure 9:
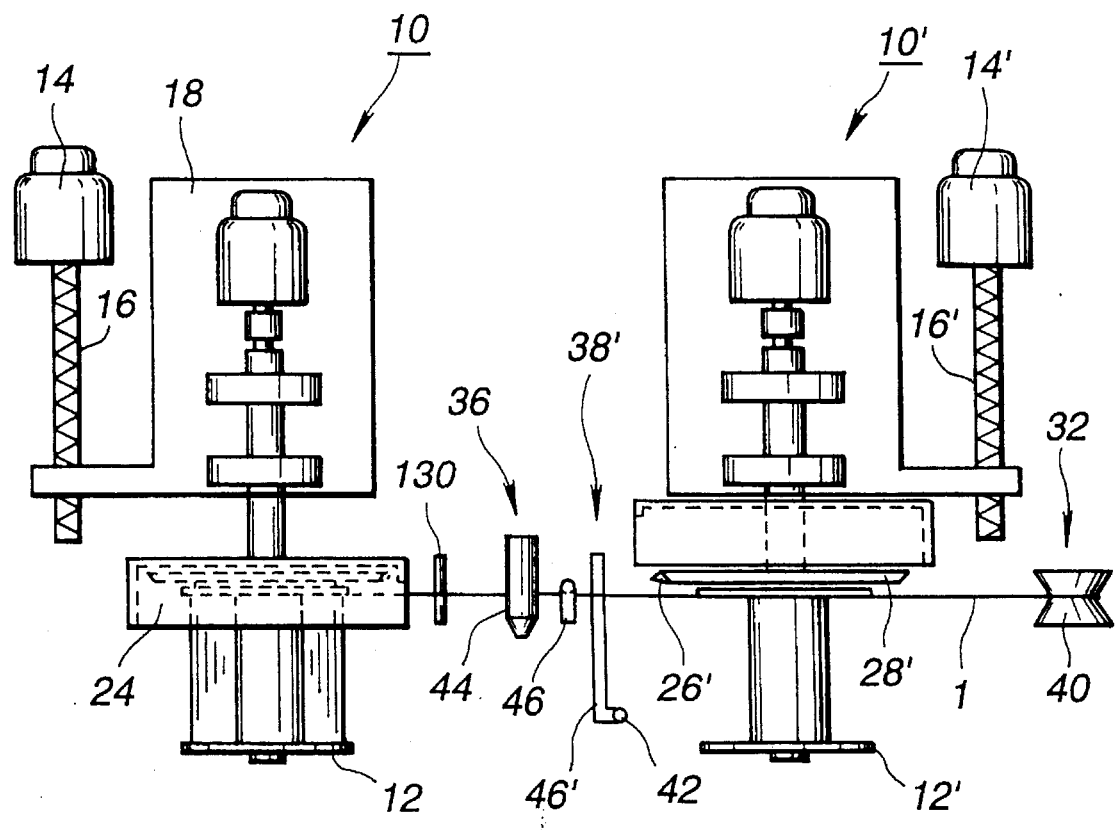
FIG. 9 schematically illustrates in a plan view a fifth step of the method of the invention.
Figure 10:
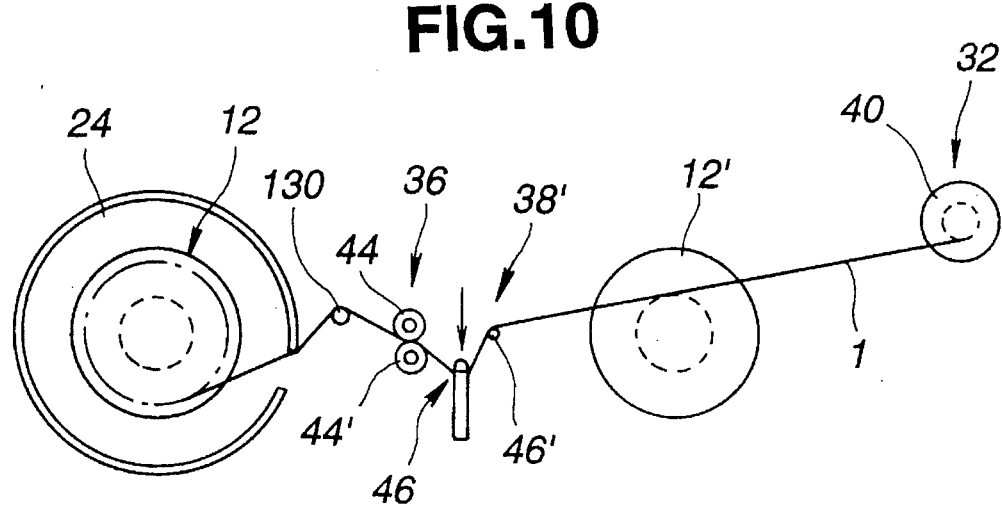
FIG. 10 schematically illustrates in a side elevational view the fifth step of the method of the invention shown in FIG. 9.

After that, as shown in FIGS. 7 and 8, the accumulator rod 46 oil the accumulator 38' is advanced to the elongated member transferring position and then, as shown in FIGS. 9 and 10, the accumulator rod 46' is advanced to the transferring position. As noted from FIG. 10, the accumulator rod 46' is positioned on the under side of the elongated member 1 while the accumulator rod 46 is positioned on the upper side of the elongated member 1 between the elongated member pinching section 36 and the accumulator rod 46'.

As shown in FIGS. 9 and 10, since the accumulator rod 46 of the accumulator 38' moves so that it forces the elongated member 1 downwardly relative to the accumulator rod 46', the elongated member 1 is accumulated in the form of wave between the pressure rolls 44 and 44' and the accumulator rod 46'.

Figure 12:
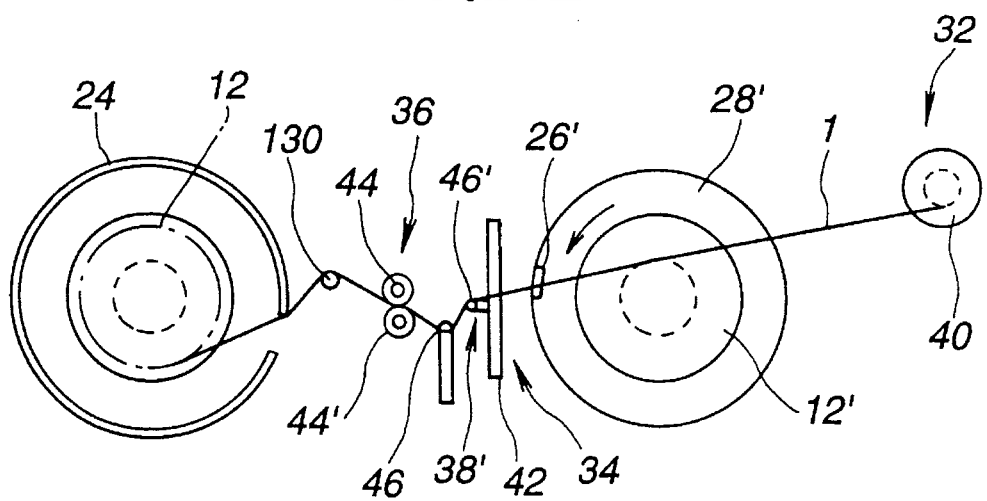
FIG. 12 schematically illustrates in a side elevational view the sixth step of the method of the invention shown in FIG. 11.
Figure 13:
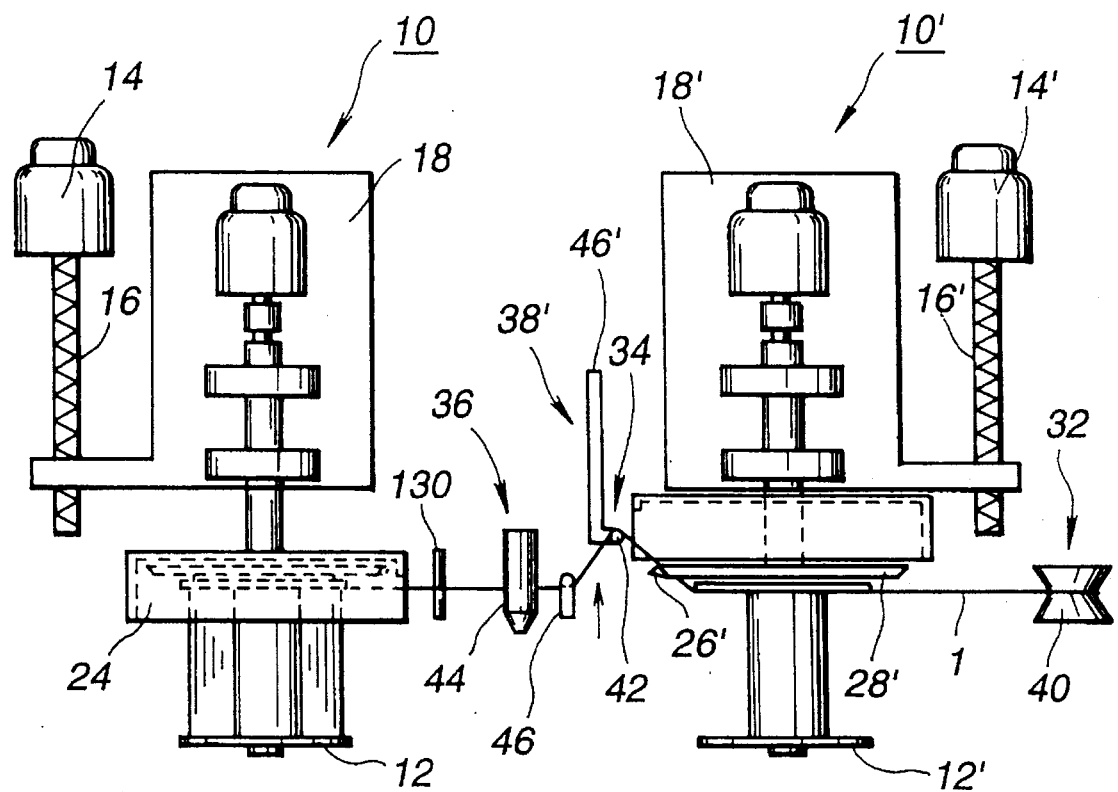
FIG. 13 schematically illustrates in a plan view a seventh step of the method of the invention.
Figure 14:
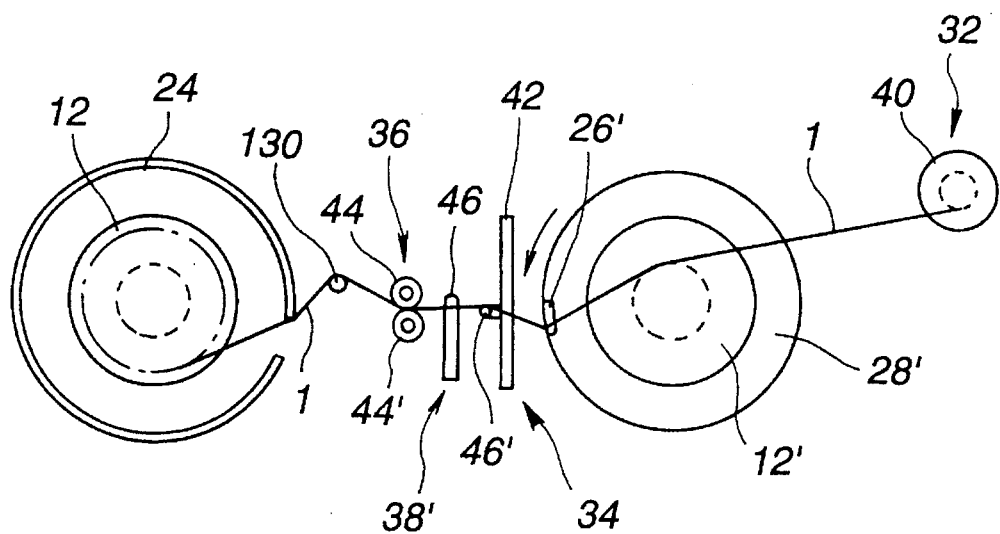
FIG. 14 schematically illustrates in a side elevational view the seventh step of the method of the invention shown in FIG. 13.
Figure 16:
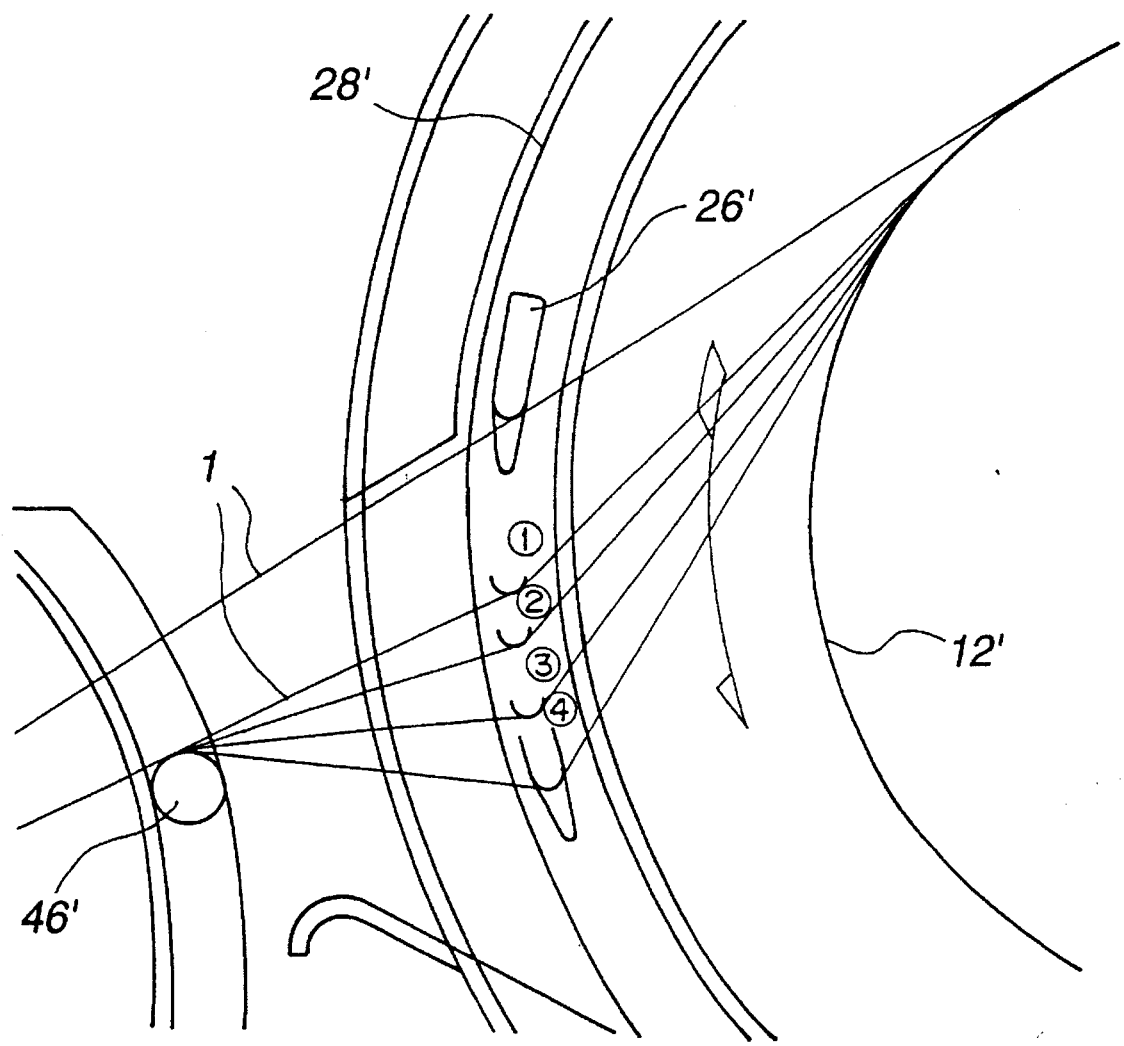
FIG. 16 illustrates in enlarged scale the elongated member being caught and cut by a catching pawl on a catching member when it is transferred.
Figure 17:
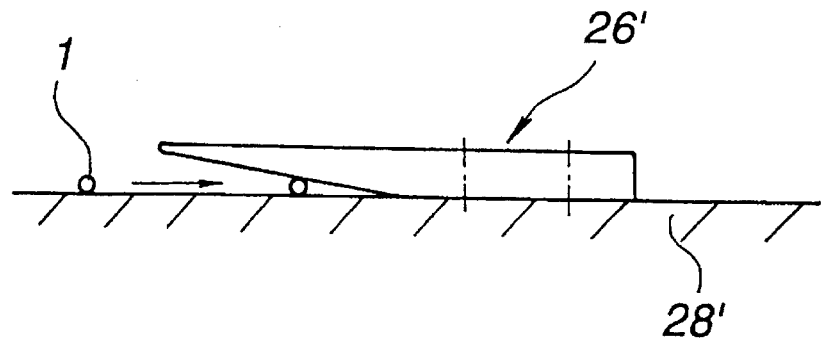
FIG. 17 illustrates in enlarged and side elevational view the elongated member being caught by the catching pawl.

As shown in FIGS. 9, 11 and 12, the drawing rod 42 of the elongated drawing section 34 moves from a position of FIG. 9 to a position of FIG. 11 where the upstream portion of the elongated member 1 relative to the accumulator 38' is drawn by the drawing rod 42 to the catching member 28' on the spooler 10'. Since the spooler 10' already rotates, the elongated member 1 which is drawn to the catching member 28' is caught between the catching pawl 26' and the disk-like catching member 28' as shown in FIGS. 16 and 17 when the catching pawl 26' passes the elongated member 1 together with the catching member 28'. Thus, the elongated member 1 is securely held on the spool 12' on the spooler 10.

Since a higher tension is applied to the elongated member 1 between the pressure rolls 44 and 44' and the catching pawl 26', the elongated member 1 is more securely caught between the catching member 28' and the catching pawl 26' while it forces the accumulator rod 46 of the accumulator 34 to be returned upwardly. As the catching member 28' further rotates, the tension of the elongated member 1 between the pressure rolls 44 and 44' and the catching pawl 26' becomes higher until the elongated member 1 is forcely cut. Thus, the succeeding upperstream portion of the elongated member 1 is wound on the spool 12' on the spooler 10'.

In this manner, the wind-terminating portion of the elongated member 1 is cut away from the upstream portion of the elongated member 1 to be wound on the spool 12' on the spooler 10', passes through the pressure rolls 44 and 44' and is introduced into the end cover 24 surrounding the spool 12 because the spooler 10 is still operated. Thus, the wind-terminating portion of the elongated member 1 rotatably moves widely while slidably engaging the inner face of the end cover 24 by centrifugal force until the spool 12 on the spooler 10 stops. At that time, the spool 12 is removed out of the spooler 10 and a vacant spool 12 is mounted thereon for preparing, the next winding operation.

There are shown in FIG. 16 detail relations of the elongated member 1 and the catching pawl 26' after it is caught by the catching pawl 26' until it is cut thereby. As shown in this figure, as the catching member 28' rotates in a counter-clockwise direction as viewed in FIG. 16, the catching pawl 26' moves from a position where it is about to engage the elongated member 1 as indicated by a solid line of FIG. 16 and on a rightward side of FIG. 17 subsequently to positions indicated by ①, ②, ③ and ④ of FIG. 16. As the catching pawl 26 moves in such a manner, the accumulator rod 46 of the accumulator 38' is pushed up by the tension applied to the elongated member 1 and therefore the elongated member 1 will be never cut immediately after the catching pawl 26' reaches the position of FIG. 12 until the catching pawl 26' reaches the position of FIG. 14

Figure 18:
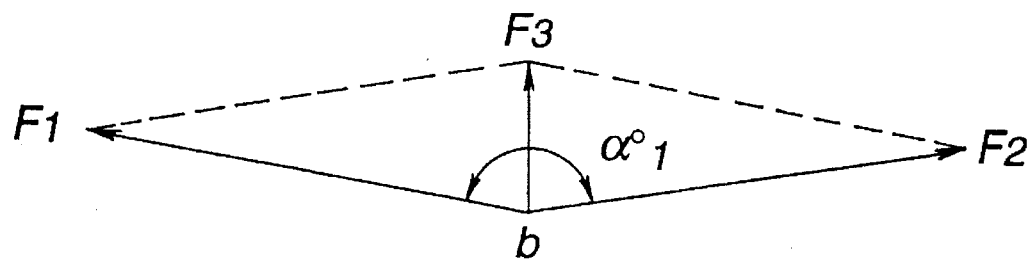
FIG. 18 illustrates a vector of a tension applied to the elongated member and a force at which the elongated member is caught by the catching pawl when the latter is located at a position ② of FIG. 16.
Figure 19:
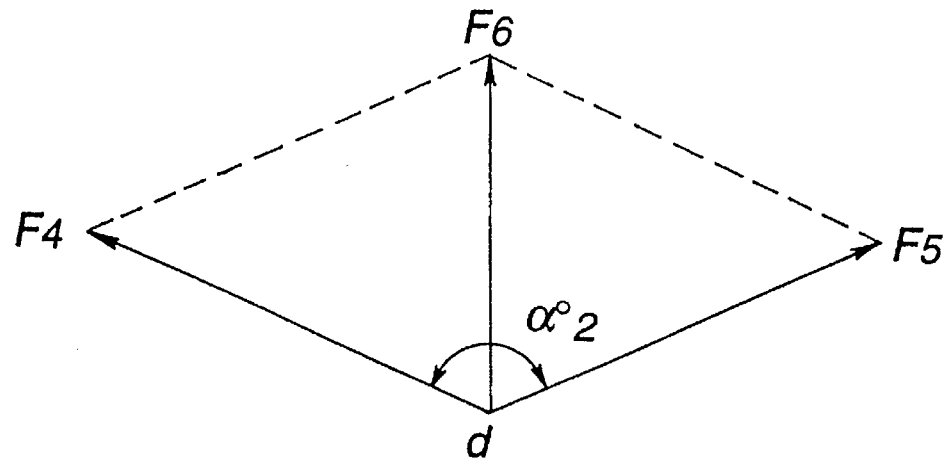
FIG. 19 illustrates a vector of a tension applied to the elongated member and a force at which the elongated member is caught by the catching pawl when the latter is located at a position ④ of FIG.16.

The comparison of the forces by which the elongated member 1 is inserted between the catching pawl 26' and the catching member 28' when the catching pawl 26' is located at the positions ② and ④ of FIG. 16, respectively are as shown in FIGS. 18 and 19. In these figures, symbols "b" and "d" indicate points of the elongated member 1 to which forces are applied at the positions ② and, ④, respectively, symbols "$\alpha^\circ_1$" and "$\alpha^\circ_2$" indicate angles of the elongated member 1 deformed by the catching pawl 26' and having apexes of "b" and "d" where the forces are applied to the elongated member 1 at the positions ② and ④, respectively. Also, in these figures, symbols "$F_1$", "$F_2$" and "$F_4$", "$F_5$" indicate tensions applied to the elongated member 1 at the positions ② and ④, respectively while symbols "$F_3$" and "$F_6$" indicate forces by which the elongated member 1 is inserted into the catching pawl 26' at the positions ② and ④, respectively.

As noted from FIGS. 18 and 19, as the catching pawl 26' continues to rotate, the angle $\alpha$ of the elongated member 1 pulled by the catching pawl 26' becomes smaller as indicated by $\alpha^\circ_1$ and $\alpha^\circ_2$ and as a result, the force by which the elongated member 1 is inserted into the catching pawl 26' becomes larger as indicated by $F_3$ and $F_6$. In this manner, the elongated member 1 is cut at the position ④ of FIG. 16, for example.

If there is provided no accumulator 38', then the elongated member 1 cannot reach the position ④ of FIG. 16. Thus, the elongated member 1 will be cut at the position ② of FIG. 16. This causes the force by which the elongated member 1 is inserted into the catching pawl 26' to become smiler.

Since the elongated member pinching section 36 in the form of pinch rolls or pressure rolls 44 and 44' has a damping action and there is a slack of the elongated member 1 produced on the downstream side of the pressure rolls 44 and 44' and absorbed by the looper 130, the elongated member 1 on the spool 12 on which it is fully wound is prevented from being adversely affected by the excessive tension applied to the upstream portion of the elongated member 1. Thus, it will be noted that the elongated member 1 on the spool 12 on the already operating spooler 10 is never damaged or broken by the upstream tension produced when the elongated member 1 is caught and cut at the waiting spooler 10'. Since there is required no wasteful spool portion on the spool 12, the elongated member 1 is neither damaged nor broken by a tension which would be produced when it is wastefully wound on the wasteful spool portion on the spool 12.

It will be noted that the elongated member pinching section 36 also serves to prevent the wind-terminating portion of the elongated member 1 formed after it is cut away from the upstream portion of the elongated member 1 from running widely and therefore serves to safely introduce it into the end cover 24. The spooler 10 stops after the wind-terminating portion of the elongated member 1 terminates to be wound on the spool 12 on the spooler 10. The full spool 12 is removed out of the spooler 10 and a new vacant spool 12 is mounted on the spooler 10 while the elongated member 1 is being wound on the spool 12' on the spooler 10'.

The elongated member 1 continues to be wound on the spool 12' on the spooler 10' and after it is nearly fully wound on the spool 12', it is transferred from the spooler 10' to the spooler 10. At that time, the guide pulley 40 of the elongated member shifting section 32 moves from the solid line position of FIG. 2 beyond the dotted line position thereof to a position where the elongated member 1 engages the new spool 12 on the spooler 10. The steps of transferring the elongated member 1 from the spooler 10' to the spooler 10 are substantially identical to those of transferring it from the spooler 10 to the spooler 10' and therefore the elongated member pinching section 36, the looper 130, the accumulator 38 and the elongated member drawing section 32 are operated in the same manner.

Figure 20:
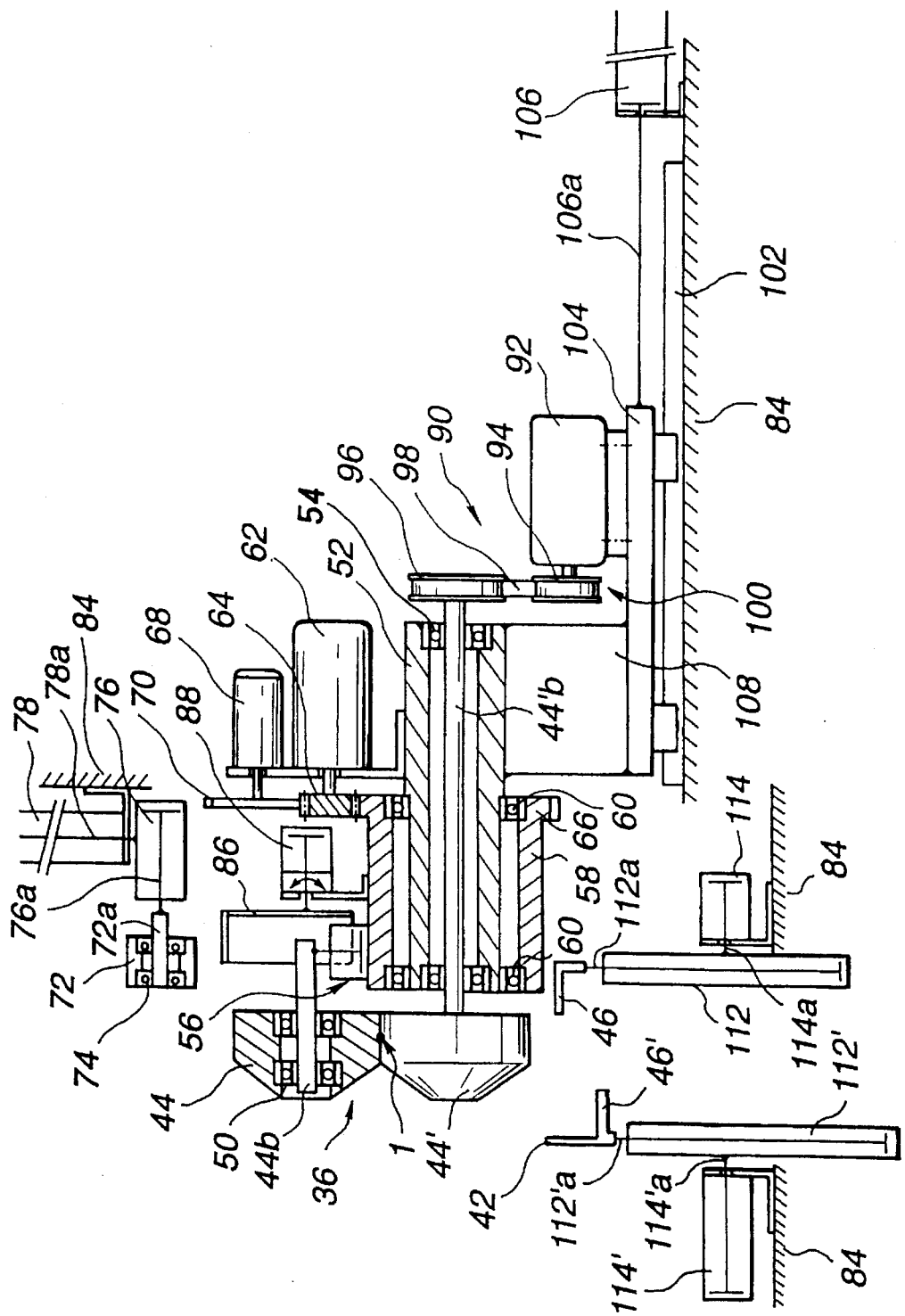
FIG. 20 is a side elevational view of a schematic system of an apparatus for successively winding an elongated member constructed in accordance with the invention with a portion broken away.

An apparatus for carrying out the method of the invention constructed in one embodiment of the invention will be described hereinafter with reference to FIGS. 20 through 30. FIG. 20 schematically illustrates the apparatus of the invention. The pressure roll 44 of the elongated member pinching section 36 is rotatably supported through a bearing 50 on a roll shaft 44b while the pressure roll 44' is securely held on the roll shaft 44'b, which is in turn rotatably supported through a bearing 54 on a holding cylindrical body 52. As shown in FIG. 31, a line $Li$ connecting the axes of the pressure rolls 44 and 44' with each other is so set as to be inclined by an angle of about 20° relative to a line $Lv$ normal to a line $Lh$ connecting the axes of the spools 12 and 12'.

Figure 21:
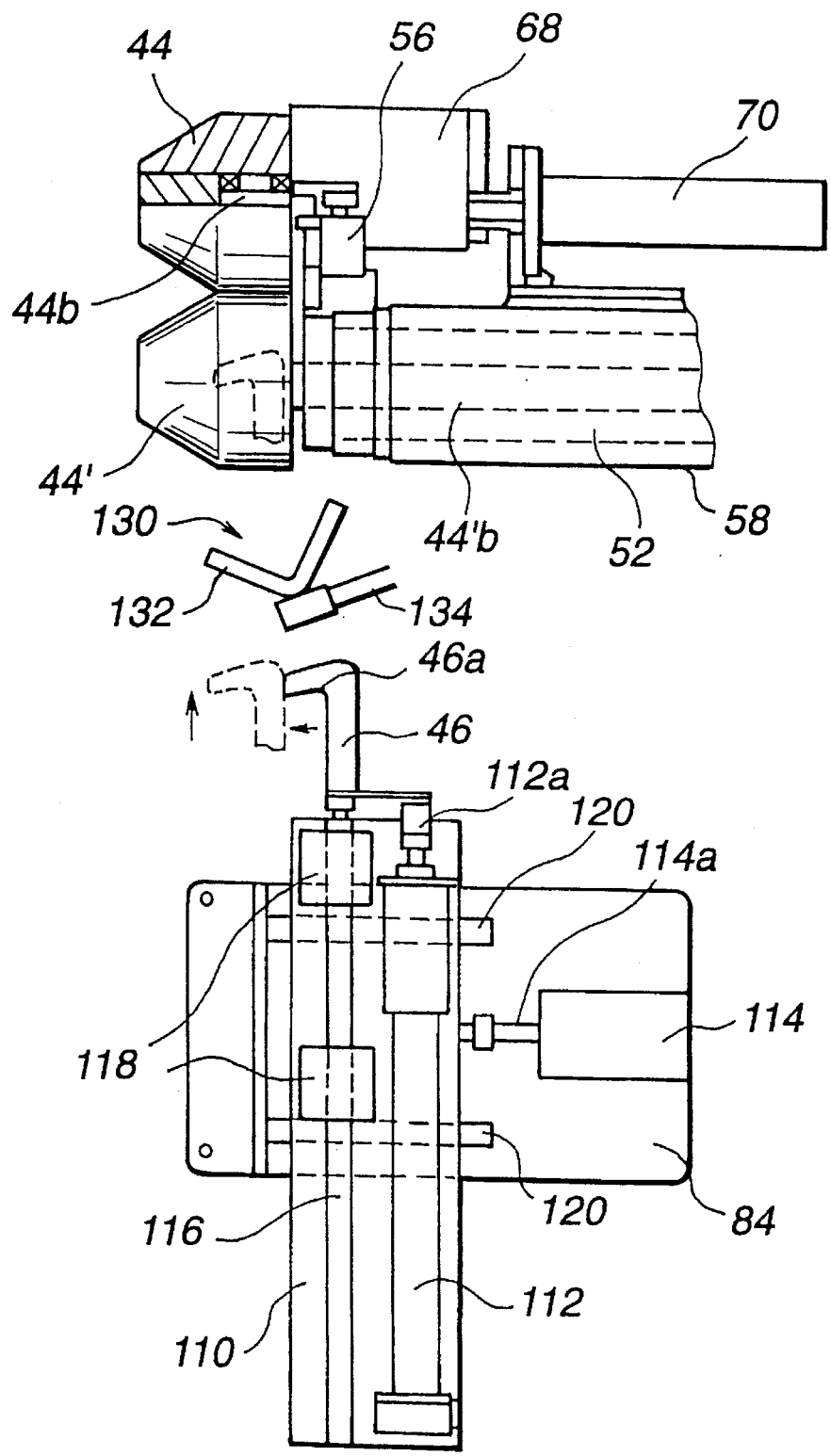
FIG. 21 is a side elevational view of an elongated member pinching section and one of accumulator rods in an accumulator used for the invention with the relation thereof shown therein.

As shown in FIGS. 20 and 21, the roll shaft 44b of the pressure roll 44 is supported through a guiding twin rod cylinder 56 on the outer cylindrical body 58, which is in turn supported through a bearing 60 on the holding cylindrical body 52. The guiding twin rod cylinder 56 serves to urge the pressure roll 44 downwardly so as to closely engage the pressure roll 44'. The outer cylindrical body 58 has a driven gear 66 provided integrally therewith and meshing with a drive gear 64 which is in turn driven by a rotary motor 62. Thus, the pressure roll 44 can be angularly displaced about an axis of the pressure roll 44' while the former closely engages the latter (see FIG. 27 and FIGS. 31 through 34).

Figure 34:
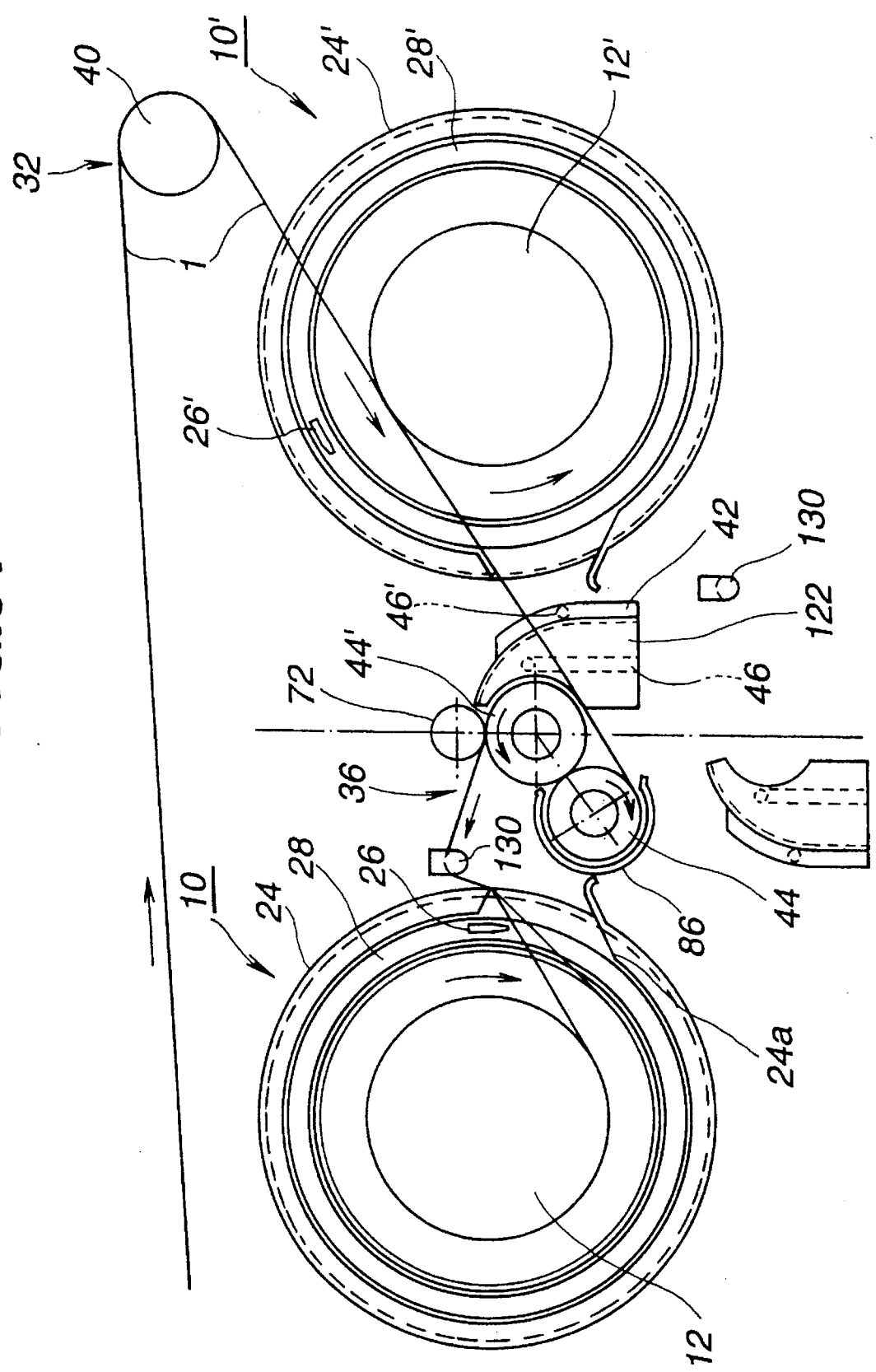
FIG. 34 illustrates in side elevational view a fourth step by which the third step of FIG. 33 is followed.

As shown in FIG. 34, the elongated member 1 pinched between the pressure rolls 44 and 44' engages the peripheries of the pressure rolls 44 and 44' in the form of S shape by angular or rotatable displacement of the pressure roll 44. Therefore, the elongated member 1 slidably moves along an approximately 260° peripheral face of the pressure roll 44 and then along a similar peripheral face of the pressure roll 44'. Such a rotatable displacement of the pressure roll 44 is made within an angle θ of rotation track indicated by a one-dot chain line of FIGS. 27 and 32 which is normally about 260°. The rotation angle of the pressure roll 44 is measured by an encoder 68 which is connected to a measurement gear 70 meshing with the drive gear 64 as shown in FIG. 20.

Figure 28:
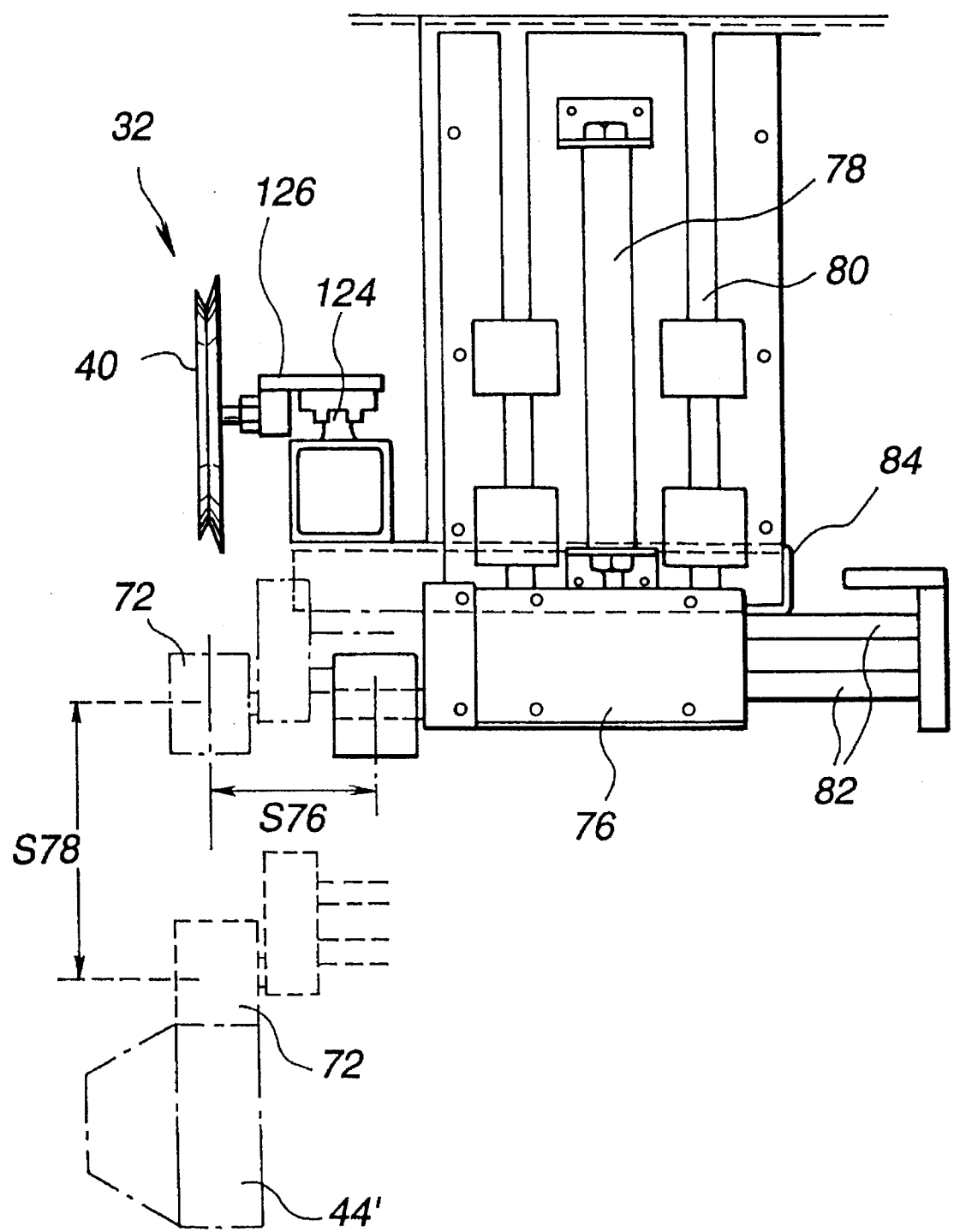
FIG. 28 is an enlarged side elevational view of an elongated member shifting section and an auxiliary pressure roll used for the elongated member pinching section.
Figure 29:
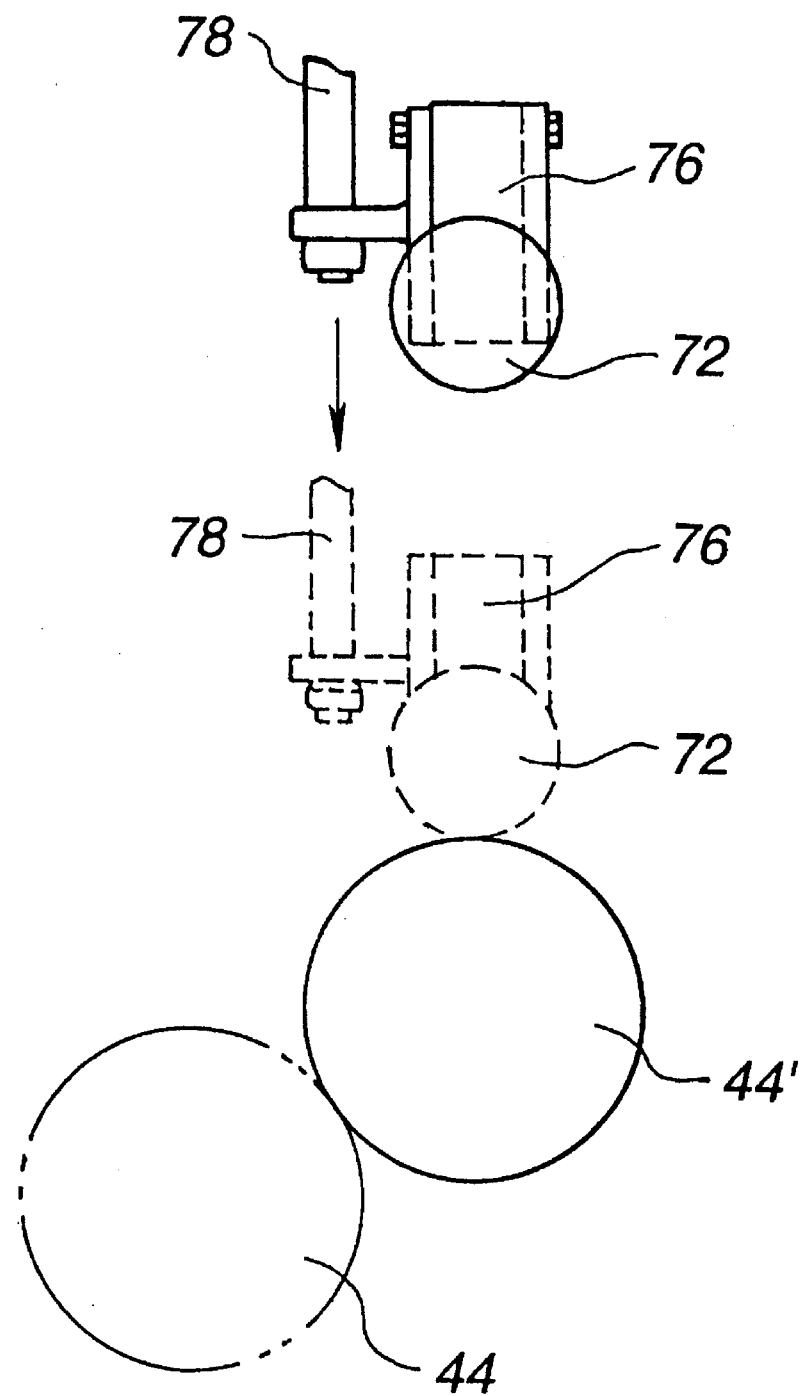
FIG. 29 illustrates the operation of the auxiliary pressure roll in front view.

As shown in FIGS. 20, 29 and 34, the elongated member pinching section 36 may be preferably provided with an auxiliary pressure roll 72 to closely engage the elongated member 1 between the auxiliary pressure roll 72 and the pressure roll 44'. As shown in FIGS. 20, 28 and 29, the auxiliary pressure roll 72 may be rotatably supported through a bearing 74 on a roll shaft 72a, which is in turn held by a piston rod 76a of a shifting air cylinder 76. The shifting air cylinder 76 may be held by a piston rod 78a of a lifting air cylinder 78 which is in turn securely held on a frame 84.

Accordingly, as shown in FIG. 34, after the pressure roll 44 is rotatably displaced around the pressure roll 44' while the former winds the elongated member 1 therearound, the auxiliary pressure roll 72 is advanced by a stroke of $S_{76}$ (see FIG. 28) by the shifting air cylinder 76 as indicated by a one-dot chain line of FIG. 28 and then is lowered by a stroke $S_{78}$ by the lifting air cylinder 78 as indicated by a dotted line of FIG. 28. This causes the auxiliary pressure roll 72 to closely engage the pressure roll 44'. Thus, the elongated member 1 is positively pinched between the pressure roll 44' and the auxiliary pressure roll 72 and also between the pressure rolls 44 and 44' and is frictionally driven thereby. As shown in FIG. 28, there may be provided lifting guide means 80 to linearly guide the shifting air cylinder 76 and shifting guide means 82 to linearly guide the auxiliary pressure roll 72.

Figure 27:
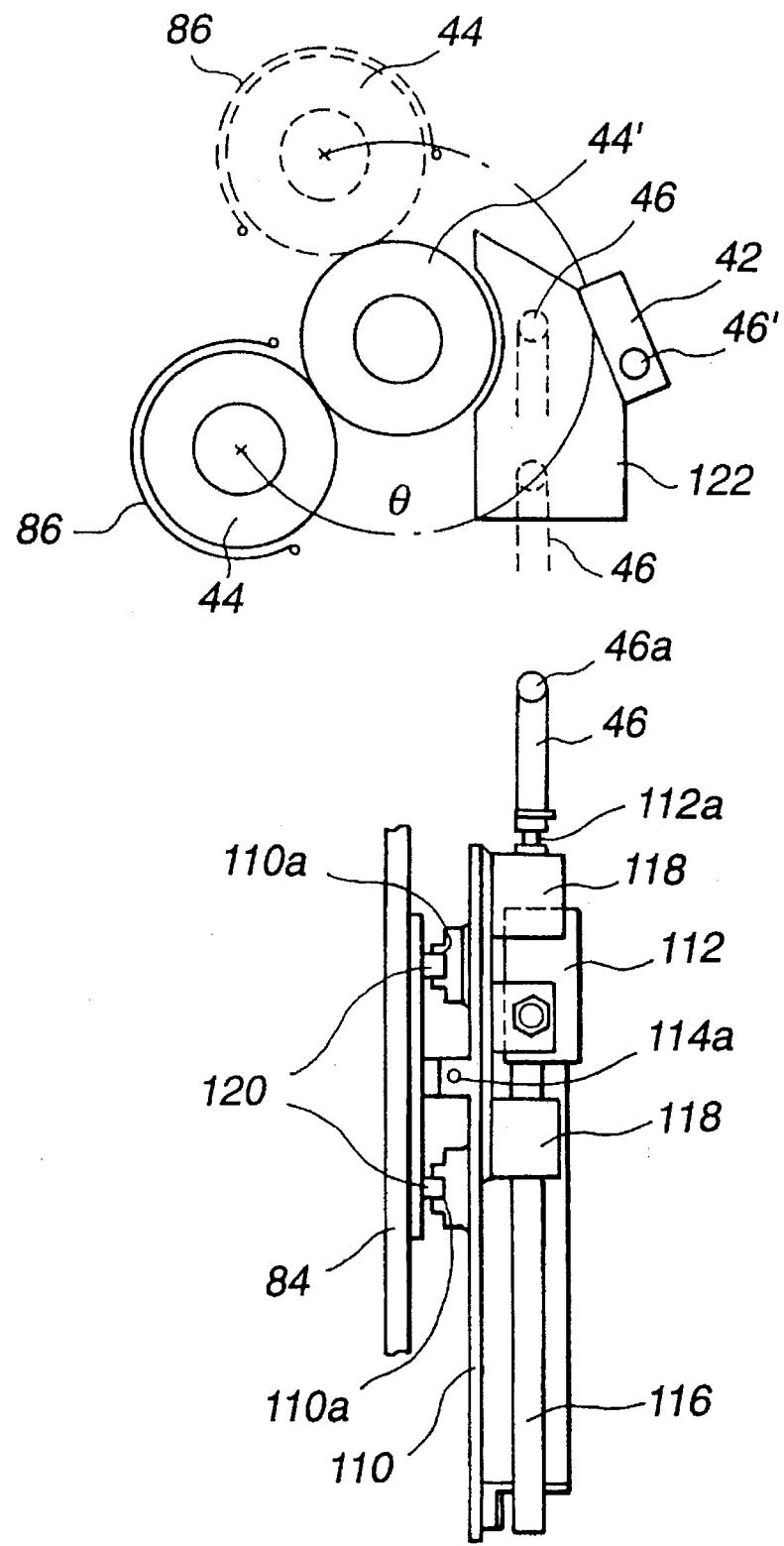
FIG. 27 is an enlarged front view of an elongated member pinching section and two accumulator rods of an accumulator with the relation thereof shown therein.

As shown in FIG. 20, a roll cover 86 is connected to a shifting rodless guide cylinder 88 so that it moves forwardly and backwardly between a dotted line position of FIG. 27 where it surrounds the pressure roll 44 and a position of FIG. 20 where it is withdrawn from the pressure roll 44. The rodless guide cylinder 88 is held on the outer cylindrical body 58. The roll cover 86 serves to prevent the wind-terminating portion of the elongated member 1 on the spool 12 from running widely around the pressure roll 44.

As shown in FIG. 20, the roll shaft 44'b of the pressure roll 44' is connected to a rotary drive source 90, which may comprise a rotary motor 92 and a belt-pulley mechanism 100 including a pulley 94 connected to an output shaft of the rotary motor 92, a pulley 96 connected to the roll shaft 44' and a belt 98 engaging the pulleys 94 and 96 therebetween.

As already aforementioned with respect to the operation of the method of the invention, the pressure rolls 44 and 44' moves in forward and backward directions between the position where it is withdrawn from the elongated member transferring position and the position of FIGS. 20 and 31 through 35 where it is located at the elongated member transferring position. As shown in FIG. 20, means to move the pressure rolls 44 and 44' may comprise a carriage 104 being guided along linear guide rails 102 provided on the frame 84 and a shifting air cylinder 106 mounted on the frame 84 and having a piston rod 106a connected to the carriage 104. The holding cylindrical body 52 is mounted on the carriage 104 while the rotary motor 92 of the rotary drive source 90 is directly mounted on the carriage 104.

Accordingly, when the piston rod 106a of the shifting air cylinder 106 is extended, the carriage 104 advances and also the elongated member pinching section 36 advances to the transferring position of the elongated member 1 as shown in FIGS. 20 and 31 through 35. As already described with reference to FIG. 15, the elongated member 1 is pinched between the pressure rolls 44 and 44' of the elongated member pinching section 36. Thereafter, as shown in FIG. 34, the pressure roll 44 rotates about the axis of the pressure roll 44' from the rotary motor 62 through the drive gear 64 and the outer cylindrical body 58 to wind the elongated member 1 therearound. After that, as indicated by the solid line of FIG. 27, the roll cover 86 is advanced by the extension of the shifting air cylinder 88 to surround the pressure roll 44 and finally the auxiliary pressure roll 72 is advanced and lowered so that the elongated member 1 is pinched between the pressure roll 44' and the auxiliary pressure roll 72.

Figure 26:
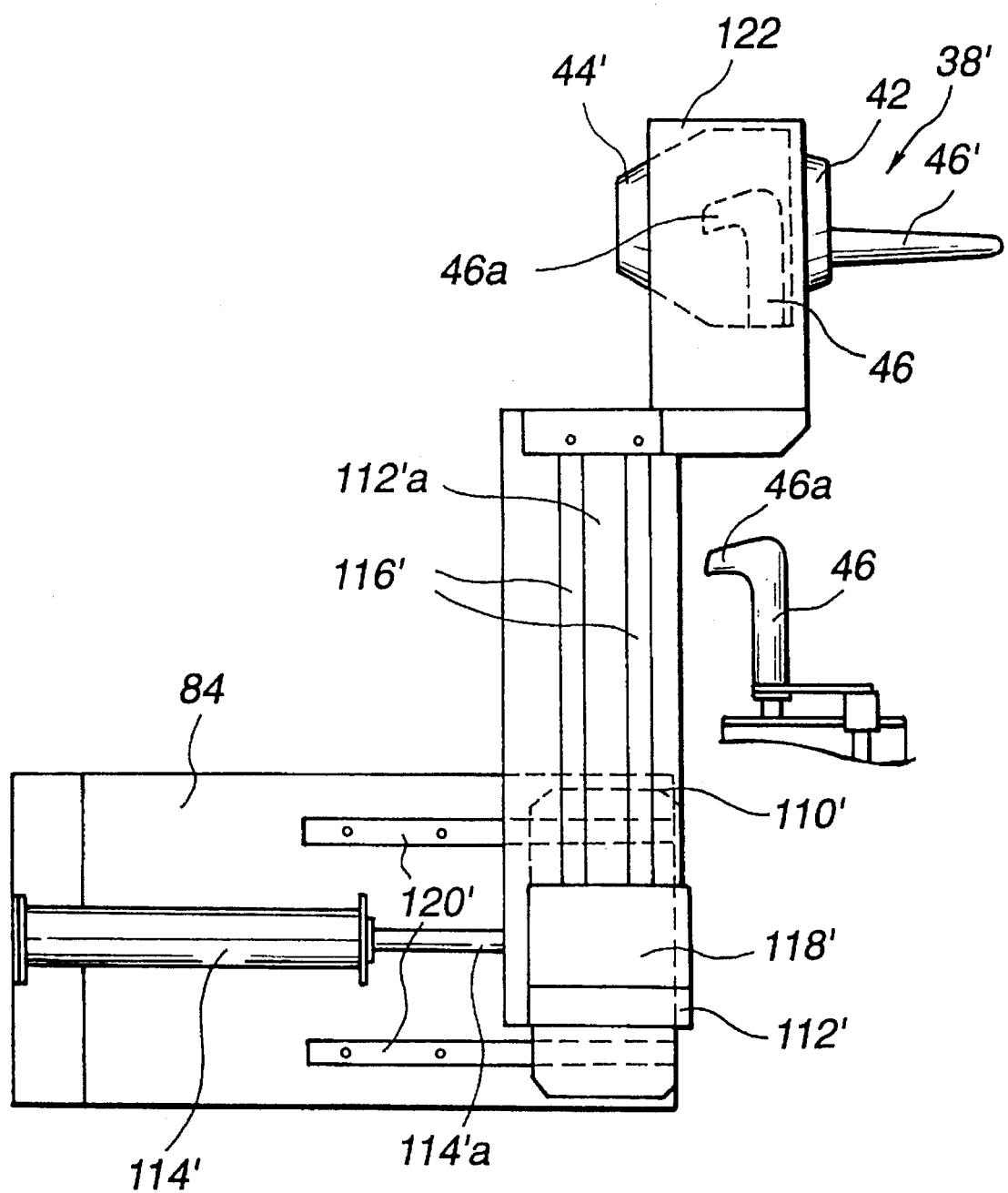
FIG. 26 is an enlarged front view of an elongated member pinching section, an accumulator having two accumulator rods and a drawing rod used for the invention with the relation thereof shown therein.
Figure 30:
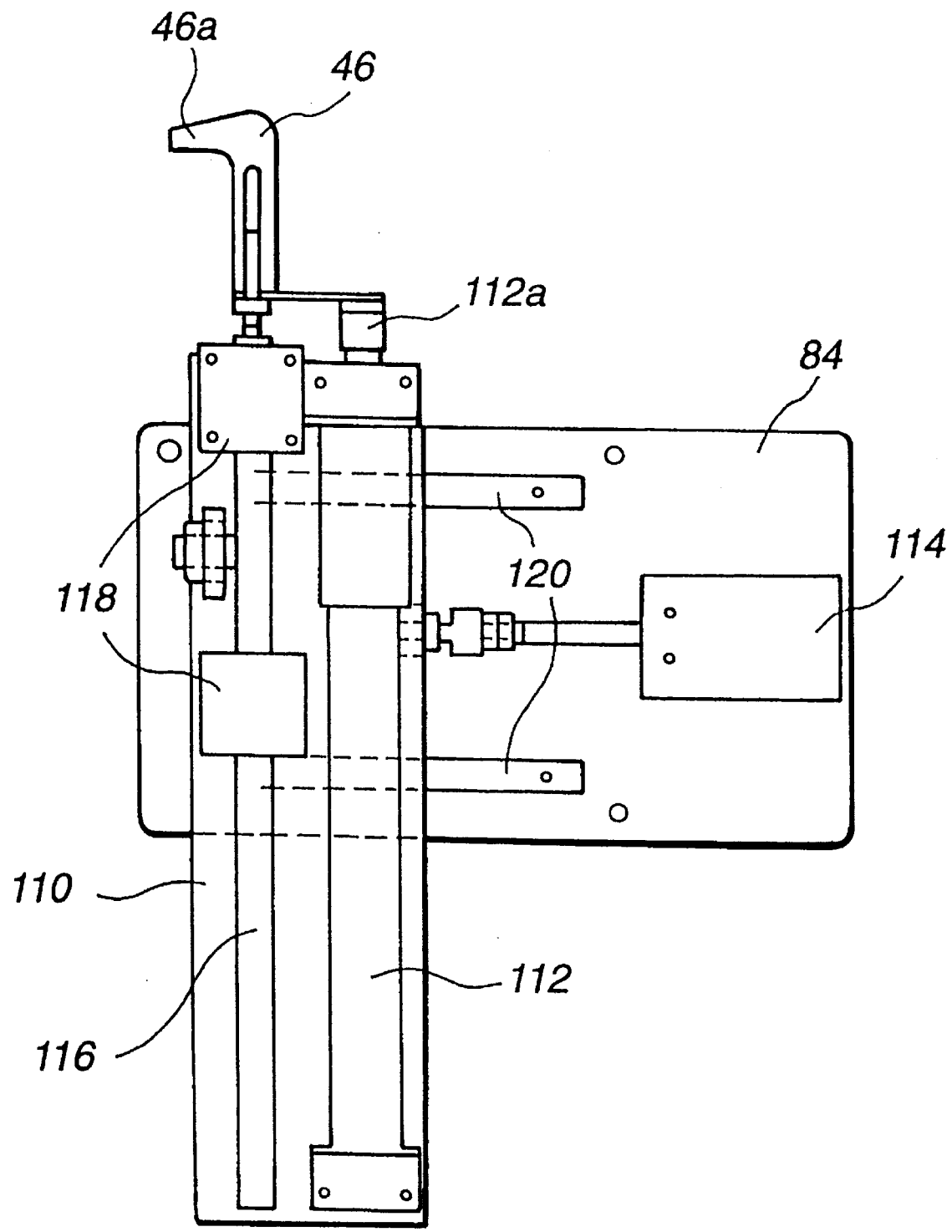
FIG. 30 is an enlarged side elevational view of one of accumulator rods for an accumulator used for the invention.
Figure 31:
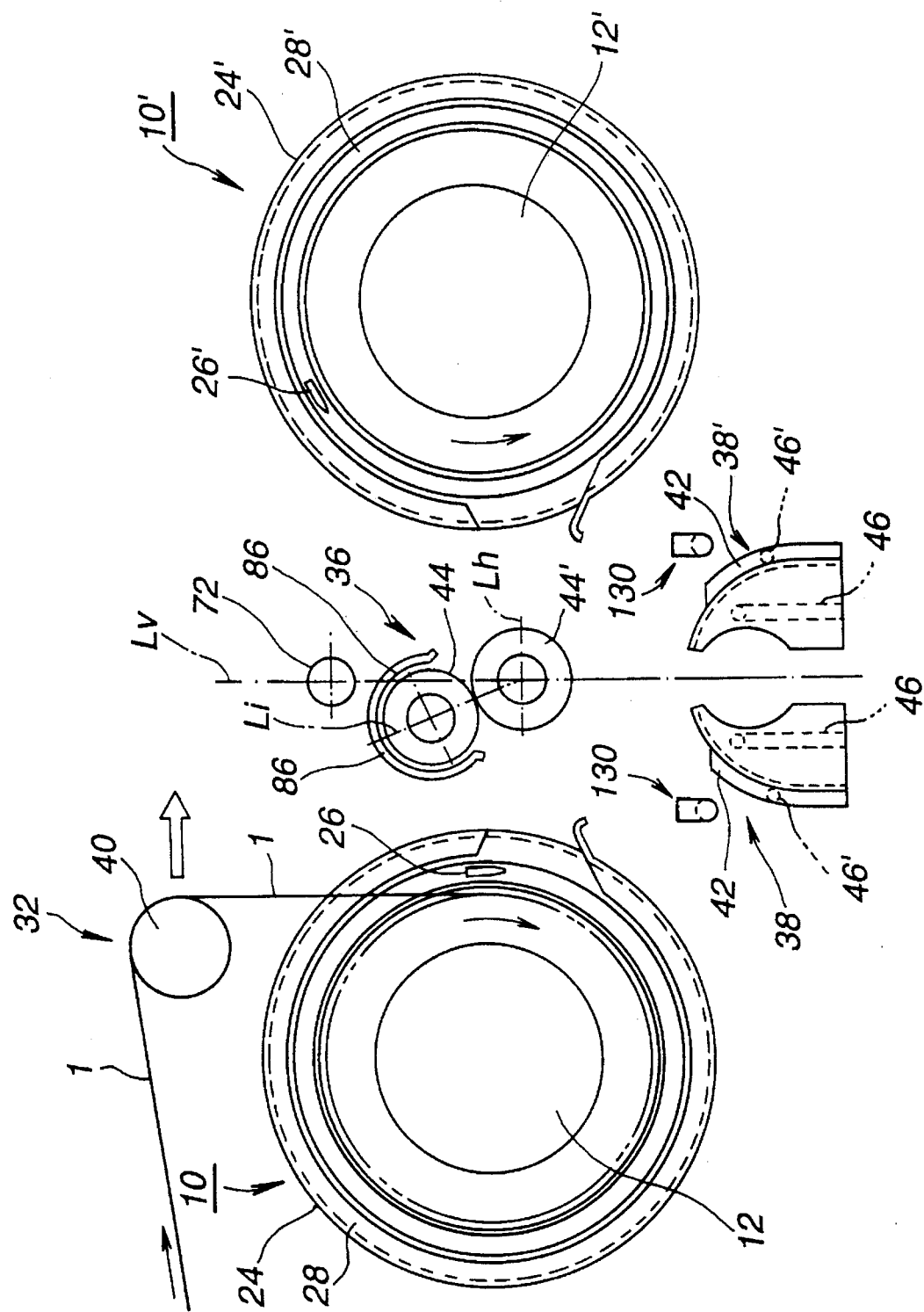
FIG. 31 schematically illustrates in side elevational view a first step of a method transferring an elongated member from one of two spoolers to another spooler according to an apparatus constructed in accordance with the embodiment of the invention shown in FIGS. 20 through 30.

As shown in FIGS. 20, 21 and 30, the accumulator rod 46 of the accumulator 38' (or 38) may have a hook-like head 46a to hook the elongated member 1. As shown in FIGS. 26 and 30, the accumulator rods 46 and 46' are connected to piston rods 112a and 112'a of lifting air cylinders 112 and 112', respectively, which are in turn mounted on movable frames 110 and 110', respectively. The movable frames 110 and 110' are held by piston rods 114a and 114'a of shifting air cylinders 114 and 114', respectively, which are in turn mounted on the frame 84.

As shown in FIGS. 26 and 30, there may be provided vertical linear guide rods 116 and 116' extending in parallel to the lifting air cylinders 112 and 112', respectively and guided by guide members 118 and 118' on the movable frames 110 and 110', respectively. Also, as shown in FIGS. 25, 26 and 27, there may be provided horizontal guide rails 120 and 120' mounted on the frame 84 so as to extend in parallel to, the shifting air cylinders 114 and 114', respectively and serving to guide the movable frames 110 and 110' while they engage guide grooves 110a and 110'a in the movable frames 110 and 110', respectively.

Figure 25:
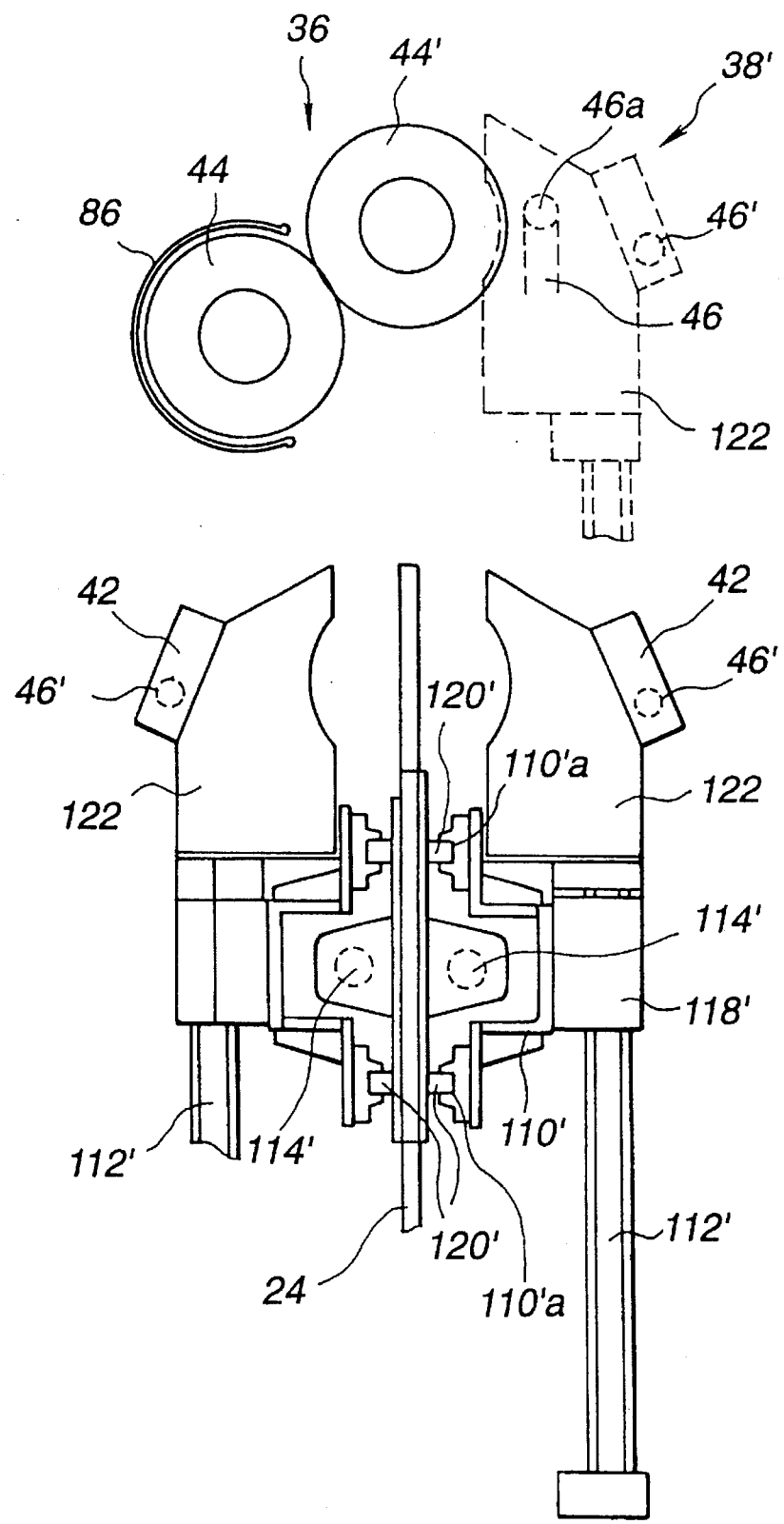
FIG. 25 is an enlarged front view of the elongated member pinching section and the accumulator having two accumulator rods used for the invention witch the relation thereof shown therein.

As already described with reference to FIG. 9 and as shown in FIGS. 20, 25 and 26, the accumulator rod 46' may be preferably provided integrally with the elongated member drawing rod 42 of the elongated member drawing section 34 and a roll cover 122 to cover the pressure roll 44' may be integrally provided on the accumulator rod 46' and the elongated member drawing rod 42. Thus, the roll cover 122 moves in an upward or downward direction or in a forward or backward direction together with the accumulator rod 46'. As indicated by the dotted line of FIG. 25 and indicated by the solid line of FIGS. 26 and 27, the roll cover 122 surrounds the pressure roll 44' at the operating position of the accumulator rod 46'.

As shown in FIG. 28, the guide pulley 40 of the elongated member shifting section 32 may be mounted on a carriage 126 moving on a guide rail 124 provided on the frame 84. Thus, it will be noted that the guide pulley 40 may shift the elongated member 1 between the spoolers 10 and 10' by driving the carriage 126 along the guide rail 124 in a horizontal manner.

Figure 22:
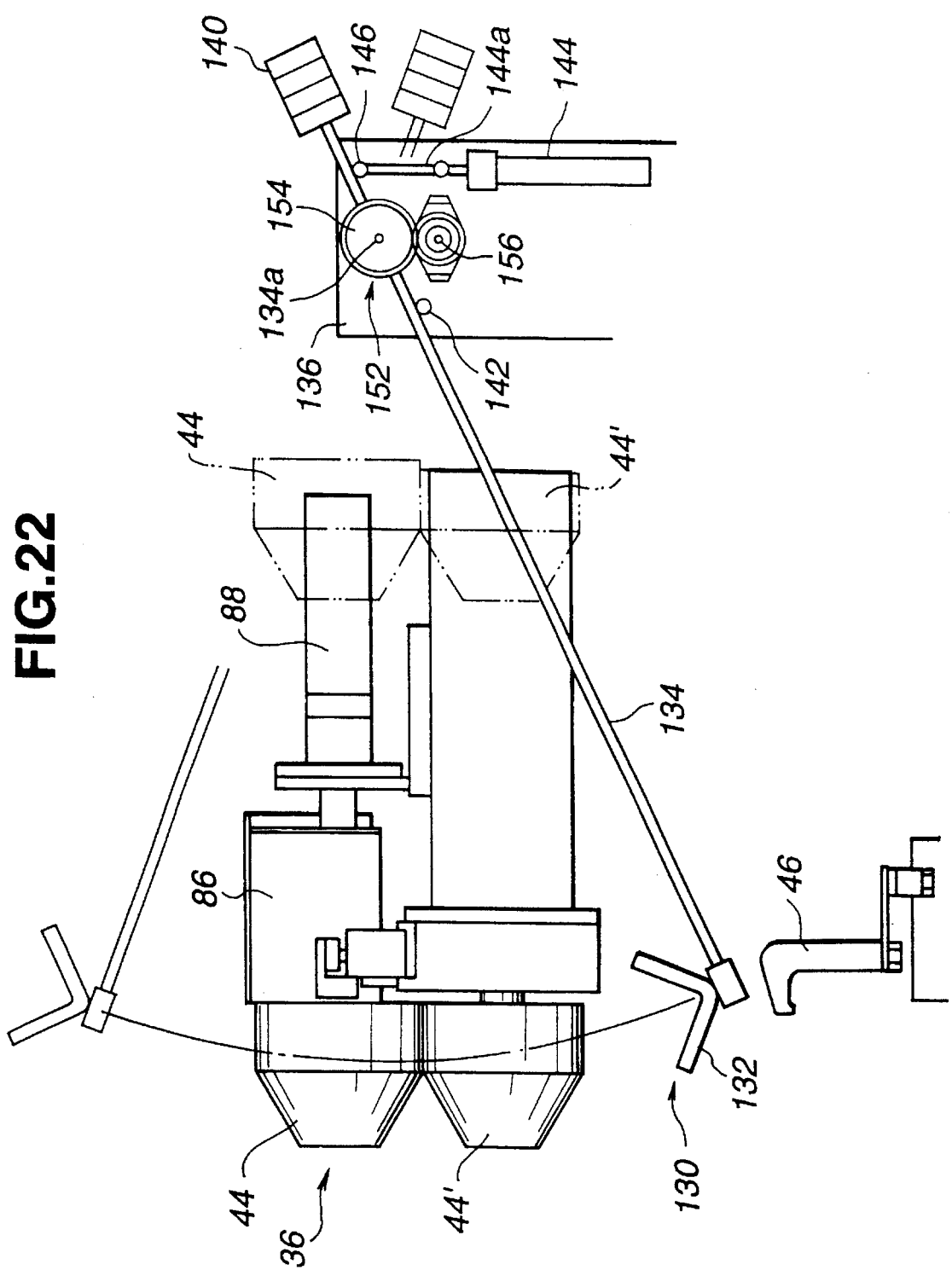
FIG. 22 is a side elevational view of a looper used for the invention.
Figure 23:
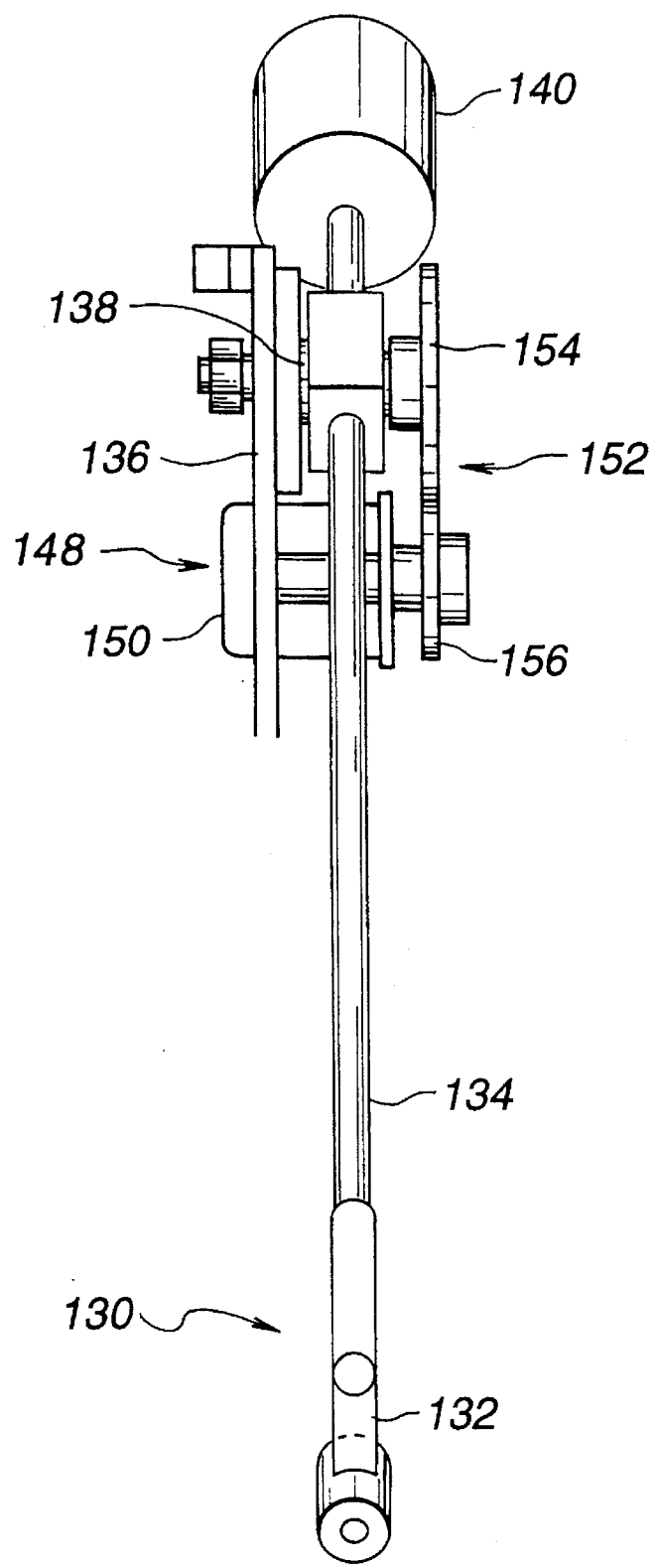
FIG. 23 is a plan view of the looper of FIG. 22.
Figure 24:
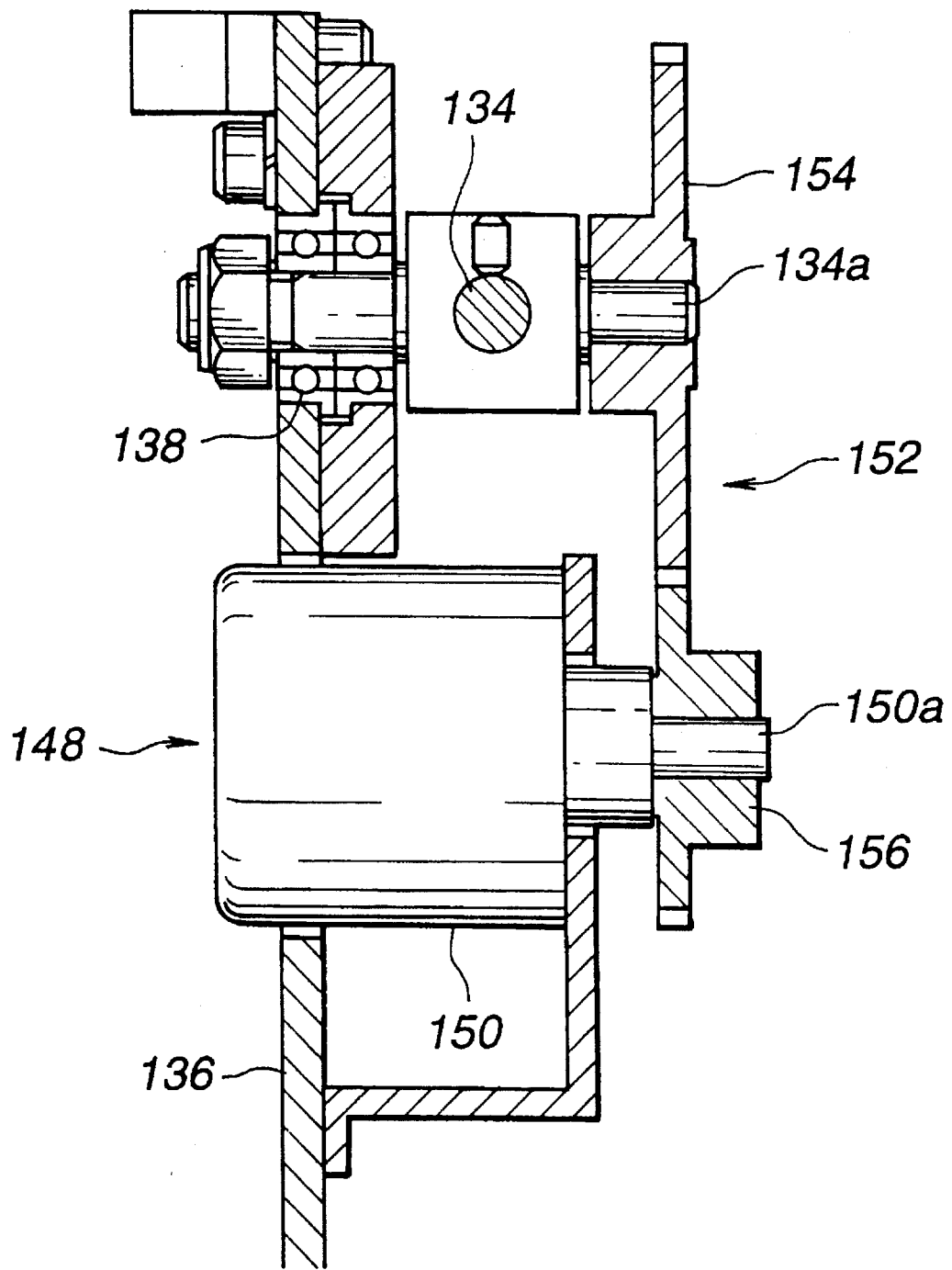
FIG. 24 is a cross sectional view of the looper taken along a line connecting axes of gears used in association with the looper and meshed with each other.

As shown in FIGS. 21 through 24, the looper 130 may comprise a V-shaped looping member 132 securely mounted on one of ends of a swinging rod 134, which is pivotally mounted on a frame 136 through a bearing 138 as shown in FIG. 24. The frame 136 may be one on which the rotary motor 62 and the encoder 68 may be mounted as shown in FIG. 20. The swinging rod 134 may have a balance weight 140 provided on the other end thereof. Thus, it will be noted that the swinging rod 134 is urged by the balance weight 140 to swingingly move in a clockwise direction as viewed from FIG. 22.

As shown in FIG. 22, a stop 142 may be provided on the frame 136 and serves to prevent the swinging rod 134 from swingingly moving in a counterclockwise direction from the position indicated by a solid line of FIG. 22. Also, as shown in FIG. 22, a control air cylinder 144 may be provided on the frame 136 and have a rod engaging member 146 provided on a top of a piston rod 144a of the control air cylinder 144. The rod engaging member 146 serves to engage the swinging rod 134 between the pivotally mounted portion thereof and the balance weight 140 to control the position of the looping member 132 and the velocity of swinging movement of the swinging rod 134. In FIG. 22, the looping member 132 is shown to be positioned below the elongated member pinching section 36 as shown in FIG. 31.

After the elongated member 1 is pinched by the pressure rolls 44 and 44' of the elongated member pinching section 36 and is slackened by the pressure rolls 44 and 44' rotating at peripheral velocity higher than the line speed of the elongated member 1, the piston rod 144a of the control air cylinder 144 is contracted while looping member 132 is upwardly displaced by the balance weight 140. Thus, the slack of the elongated member 1 is absorbed by the looping member 132 while it is deformed in the form of wave as shown in FIG. 34 with the result that a tension is applied to the elongated member 1 between the elongated member pinching section 36 and the spooler 10, but it is never affected by the tension applied to the elongated member 1 on the spooler 10' when it is caught and cut by the catching member 28'. Since the control air cylinder 144 is contracted at a controlled velocity so that the balance weight 140 never rapidly move down, the elongated member 1 tends to be looped by the looping member 132 so that an impact is never applied thereto.

As shown in FIGS. 22 through 24 and particularly as shown in FIG. 24, a tension detector 148 may be provided on the frame 136 and may comprise potentiometer 150 mounted on the frame 136 and a mechanical connector 152 to connect the swinging rod 134 to the potentiometer 150. In the illustrated embodiment, as shown in FIG. 24, the mechanical connector 152 may comprise a drive gear 154 held by a pivotal shaft 134a of the swinging rod 134 which is sup, ported by the bearing 138 and a driven gear 156 meshed with the drive gear 154 and held by an input shaft 150a of the potentiometer 150.

As the swinging rod 134 swingingly moves so that the looping member 132 loops the elongated member 1 between the elongated member pinching section 36 and the spooler 10 while the slack thereof is absorbed, the drive gear 154 and the driven gear 156 are driven by the swinging movement of the swinging rod 134 and therefore the potentiometer 150 generates a tension signal indicating the tension applied to the elongated member 1 between the elongated member pinching section 36 and the spooler 10. The tension signal is used for controlling the peripheral velocity of the pressure rolls 44 and 44' and/or the winding speed of the spooler 10 so that the proper tension can be applied to the downstream portion of the elongated member 1 relative to the elongated member pinching section 36.

The operation of the apparatus as shown in FIGS. 20 through 30 is substantially identical to that described with reference to FIGS. 1 through 19 except that the elongated member pinching section 36 is operated in such a manner that the elongated member 1 is more positively pinched by the elongated member pinching section 36 so that the tension applied to the elongated member 1 when it is caught and cut at the waiting spooler 10' is never applied to the downstream portion of the elongated member 1 between the elongated member pinching section 36 and the operating spooler 10.

Figure 35:
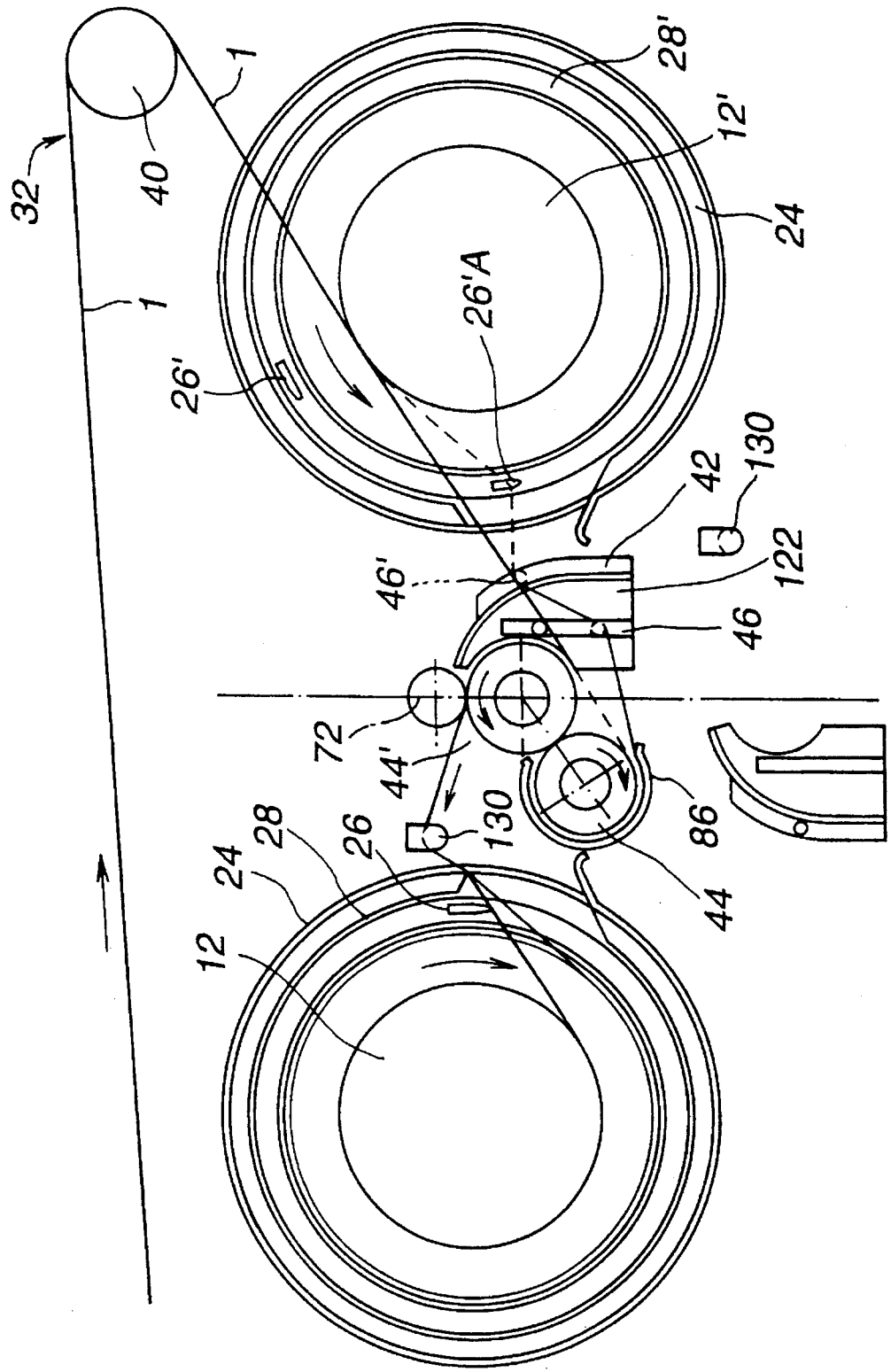
FIG. 35 illustrates in side elevational view a fifth step by which the fourth step of FIG. 34 is followed.
Figure 36:
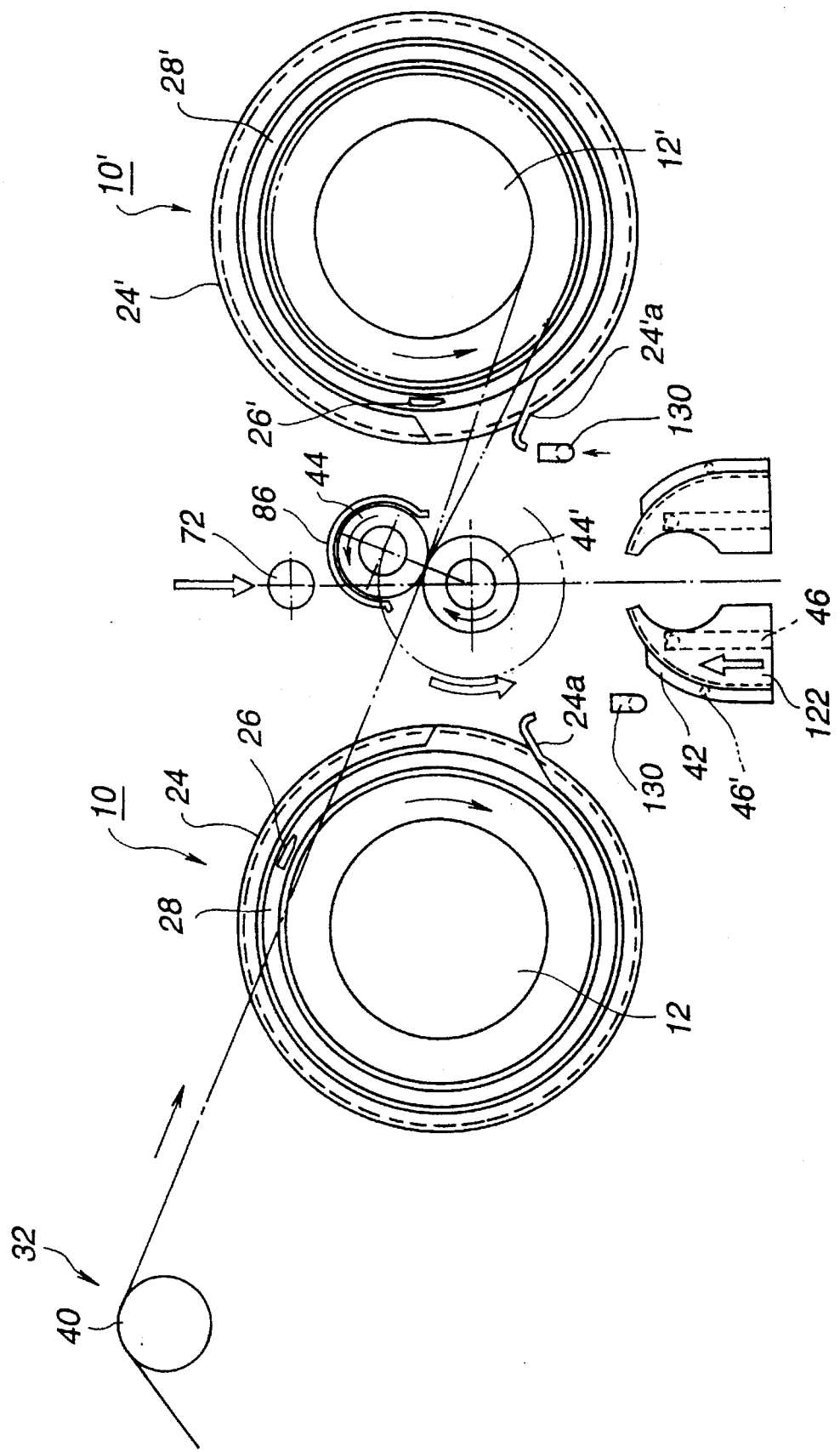
FIG. 36 schematically illustrates in side elevational view a method of transferring an elongated member according to the apparatus shown in FIGS. 20 through 30 in a reverse direction from another spooler to the one spooler.
Figure 37:
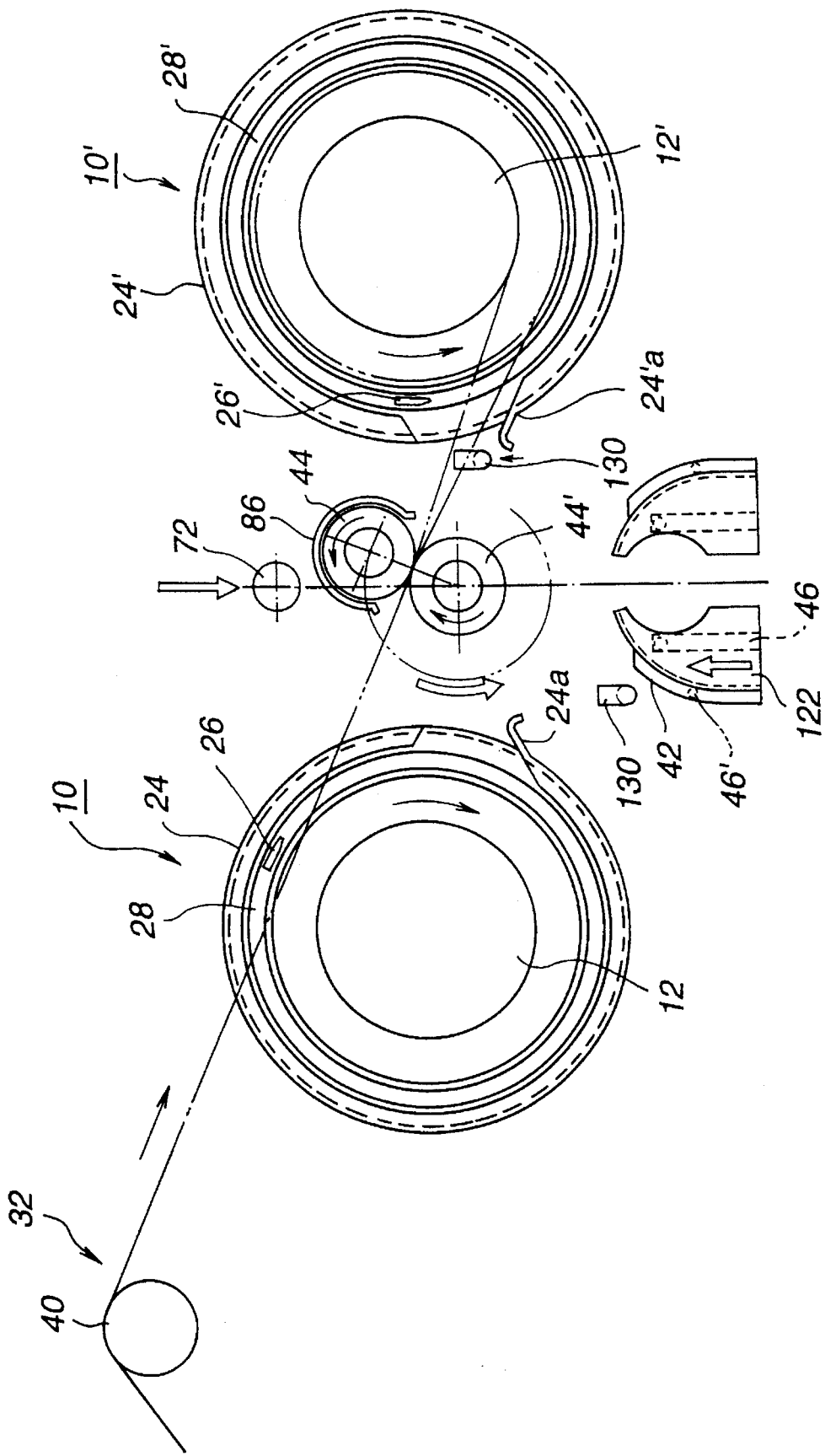
FIG. 37 illustrates in side elevational view a next step of the method of FIG. 36.
Figure 38:
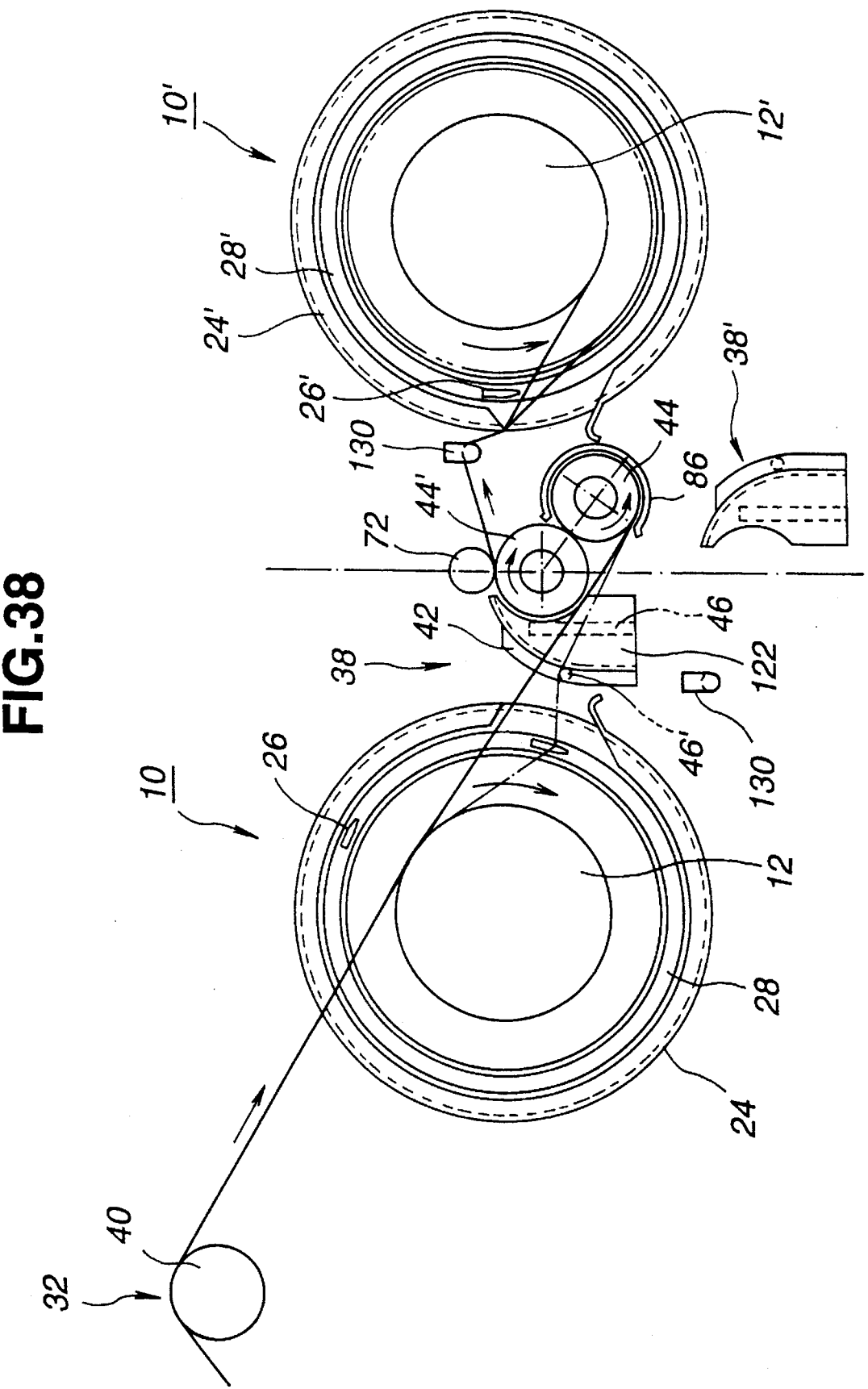
FIG. 38 illustrates in side elevational view a final step of the method of FIG. 36.
Figure 39:
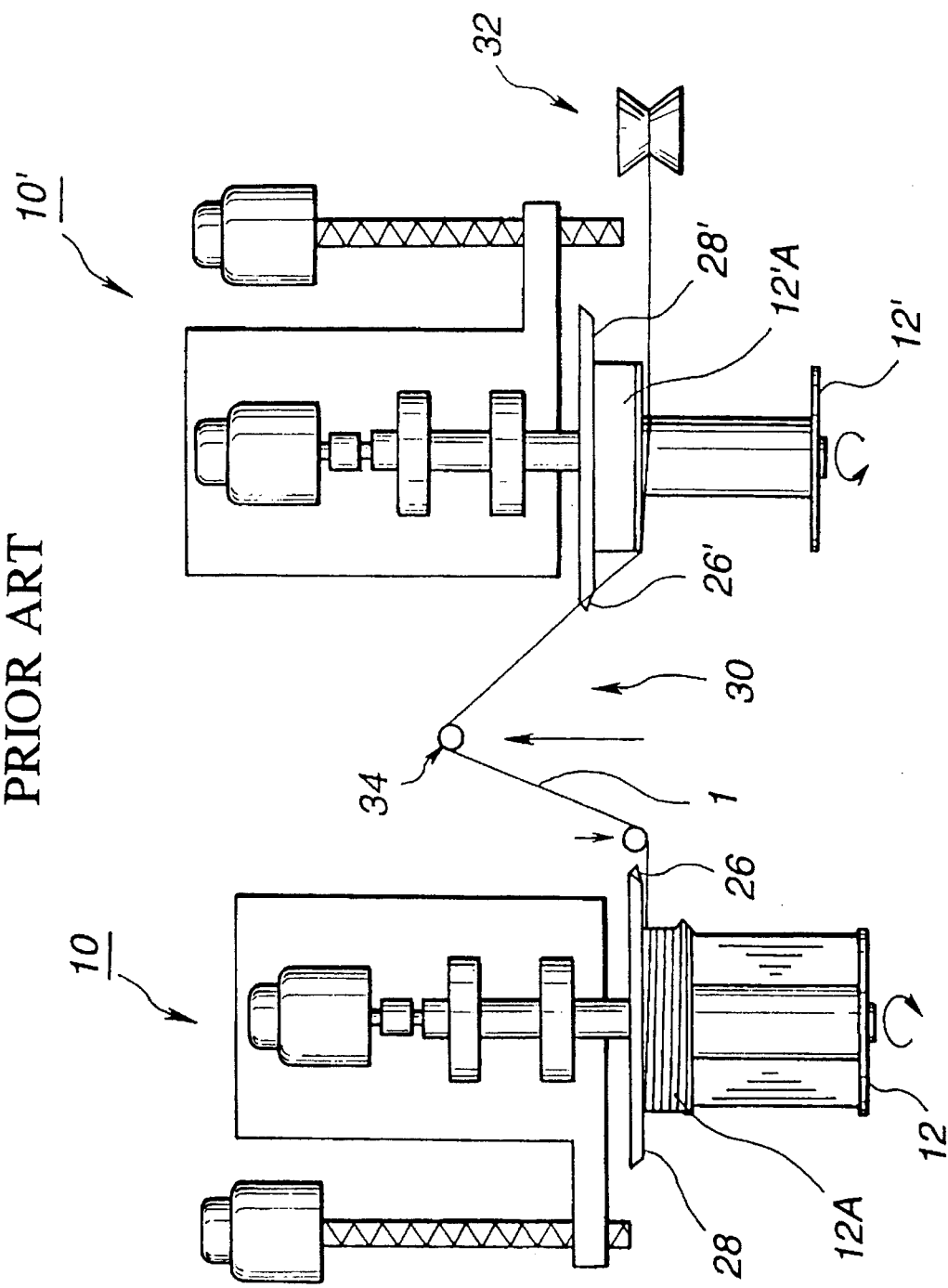
FIG. 39 schematically illustrates in plan view an operation of a prior art method.

FIGS. 31 through 35 illustrate how the elongated member 1 is transferred from the spooler 10 to the spooler 10' while FIGS. 36 through 38 illustrate how the elongated member 1 is transferred from the spooler 10' to the spooler 10.

Figure 32:
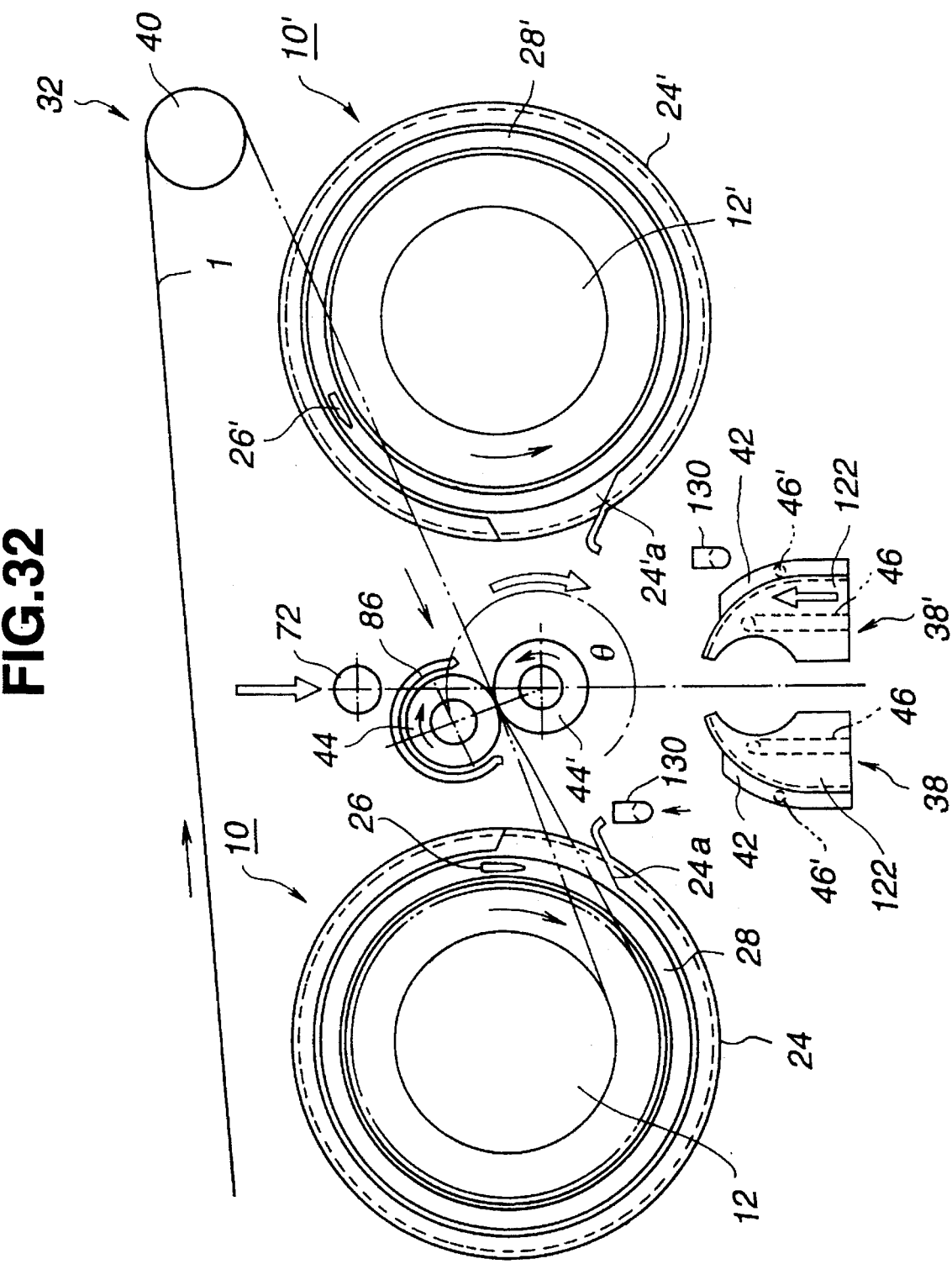
FIG. 32 illustrates in side elevational view a second step by which the first step of FIG. 31 is followed.

As shown in FIG. 31, when the elongated member 1 is nearly fully wound on the spool 12 on the spooler 10, the guide pulley 40 of the elongated member shifting section 32 moves toward the spooler 10' together with a horizontal movement of the carriage 126 along the guide rail 124 (see FIG. 8), and thereafter the carriage 104 advances by the extension of the piston rod 106a of the shifting air cylinder 106 (see FIG. 20) so that the elongated member pinching section 36 forwardly moves to the transferring position of the elongated member 1, which causes the elongated member 1 to be pinched between the pressure rolls 44 and 44' of the elongated member pinching section 6 as shown in FIG. 32. The pressure roll 44' is rotatably driven by the rotary motor 92 while the pressure roll 44 is driven by following the pressure roll 44'. As aforementioned with reference to FIGS. 1 through 19, the pressure rolls 44 and 44' are driven at peripheral velocity higher than the line speed of the elongated member 1 that is the winding sped of the spooler 10 and therefore the elongated member 1 is slackened between the elongated member pinching section 36 and the spooler 10 even though it is not shown to be slackened in FIGS. 32 and 33 for simplified illustration of the elongated member 1 in these figures.

Figure 33:
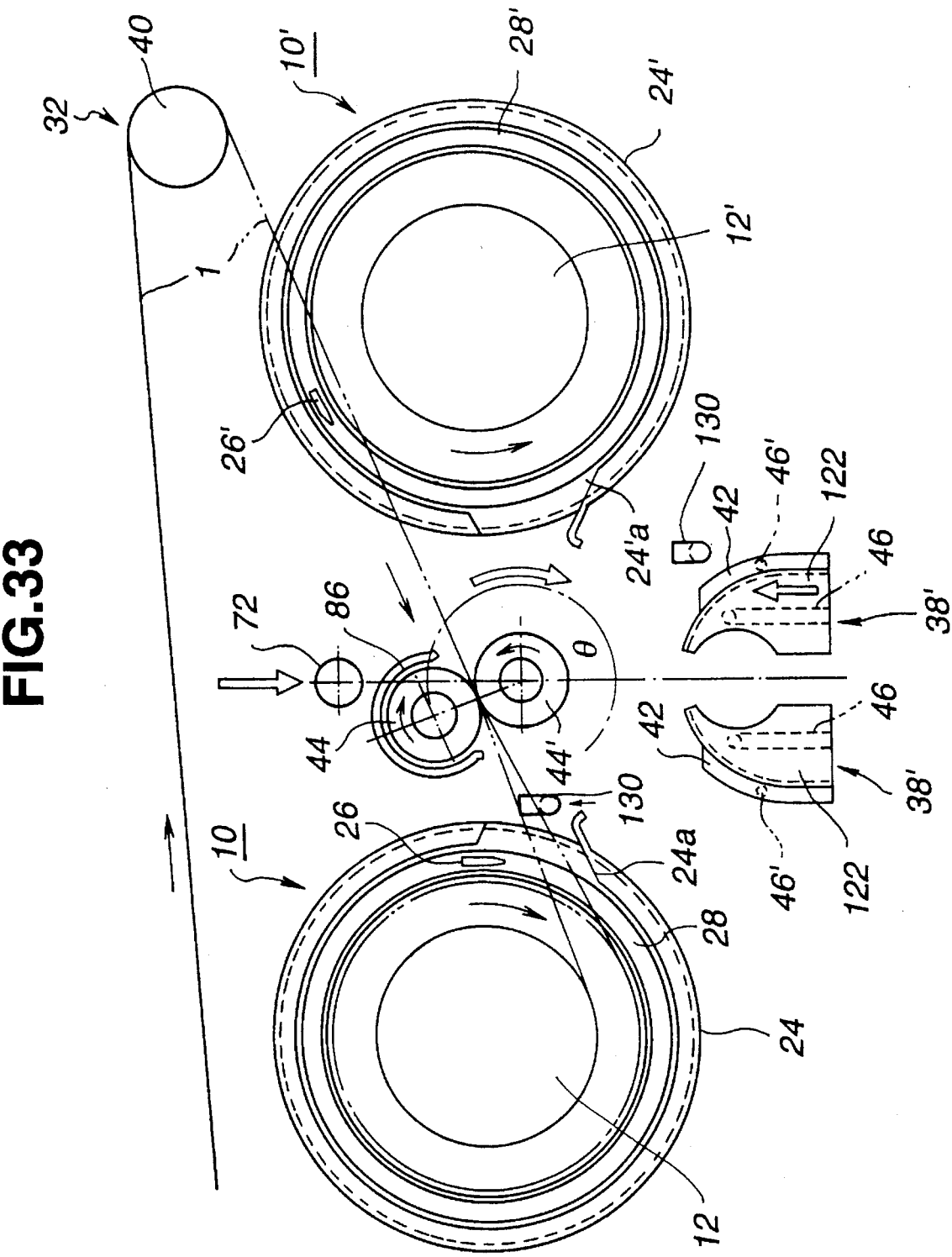
FIG. 33 illustrates in side elevational view a third step by which the second step of FIG. 32 is followed.

Thereafter, as shown in FIG. 33, the looping member 132 of the looper 130 (see FIG. 22) moves upwardly so as to engage the elongated member 1 between the elongated member pinching section 36 and the spooler 10 by the clockwise swinging movement of the swinging rod 134 as viewed from FIG. 22, which is caused by the balance weight 140 in accordance with the contraction of the piston rod 144a of the control air cylinder 144 at the controlled velocity until the looping member 132 absorbs the slack of the elongated member 1 therebetween as shown in FIG. 34. This causes the tension detector 148 to produce the tension signal therefrom. If the looping member 132 provides an appropriate tension to the elongated member 1 between the elongated member pinching section 36 and the spooler 10, then the tension signal instructs the pressure rolls 44 and 44' to be driven at a peripheral velocity corresponding to the line speed of the spooler 10. If the looping member 132 provides an excessive tension to the elongated member 1 between the elongated member pinching section 36 and the spooler 10, then the tension signal instructs the pressure rolls 44 and 44' to be driven at a peripheral velocity much higher than the line speed of the spooler 10. Reversely, if the looping member 132 provides too low tension to the elongated member 1 between the elongated member pinching section 36 and the spooler 10, then the tension signal instructs the pressure rolls 44 and 44' to be driven at a peripheral velocity lower than the line speed of the spooler 10. Thus, the appropriate tension can be applied to the elongated member 1 between the elongated member pinching section 36 and the spooler 10 so that the wound layers of the elongated member 1 on the spool 12 on the spooler 10 is neither damaged nor broken by the tension applied to the elongated member 1 on the upstream side of the elongated member pinching section 36.

As shown in FIG. 34, the pressure roll 44 is angularly displaced about the axis of the pressure roll 44' by the rotary motor 62 through the drive gear 64 and the outer cylindrical body 58 as aforementioned with reference to FIG. 20. Thus, the elongated member 1 is wound in the form of S-shape around the pressure rolls 44 and 44' and the roll cover 86 is advanced by the extension of the shifting air cylinder 88 (see FIG. 20) to surround the pressure roll 44. Finally the auxiliary pressure roll 72 is advanced by the extension of the piston rod 76a of the shifting air cylinder 76 and lowered by the extension of the piston rod 78a of the lifting air cylinder 78 to pinch the elongated member 1 between the pressure roll 44' and the auxiliary pressure roll 72. It should be noted that this positively interrupts the tension applied to the elongated member 1 on the upstream side of the elongated member pinching section 36 when it is caught and cut by the catching member 28' from being applied to the elongated member 1 on the downstream side of the elongated member pinching section 36.

After that, as shown in FIG. 34, the accumulator rod 46 of the accumulator 38' upwardly moves by means of the lifting air cylinder 112 (see FIGS. 20, 21 and 27) and advances by means of the shifting air cylinder 114 (see FIGS. 20 and 27) so that it is positioned above the elongated member 1 between the elongated member pinching section 36 and the spooler 10'. Thereafter, the accumulator rod 46' of the accumulator 38' advances and upwardly moves together with the roll cover 122 and the elongated member drawing rod 42 by means of the shifting air cylinder 114' and the lifting air cylinder 112' (see FIGS. 20, 25 and 26) as shown in FIG. 34.

Then, as shown in FIG. 35, the accumulator rod 46 of the accumulator 38' is lowered by the contraction of the piston rod 112a of the lifting air cylinder 112 indicated by a solid line of FIG. 35, the elongated member 1 is accumulated between the pressure roll 44 of the elongated member pinching section 36 and the accumulator rod 46'. Thereafter, the elongated member drawing rod 42 draws the elongated member 1 toward the disk-like catching member 28' on the spool 12' on the spooler 10'. Thus, the elongated member 1 is caught by the catching pawl 26' of the catching member 28' rotating together with the spool 12' in the same manner as aforementioned with reference to FIGS. 13 through 19.

The catching pawl 26' catching the elongated member 1 at its wind-beginning end rotates together with the spool 12' and the catching member 28' and reaches the position indicated by a numeral reference 26'A of FIG. 35 where the accumulator rod 46 is pushed up by the catching pawl 26' so that the elongated member 1 is positioned as indicated by a dotted line of FIG. 35. As described in details with reference to FIG. 16, the elongated member 1 is cut between the pressure roll 44 of the elongated member pinching section 36 and the catching pawl 26'A.

The operation after that is substantially identical to that described with reference to FIGS. 1 through 19. After the elongated member 1 is cut, the accumulator rods 46 and 46' of the accumulator 38' and the elongated member drawing rod 42 of the elongated member drawing section 34 are returned to the positions of FIG. 31 by means of the corresponding shifting air cylinders and the corresponding lifting air cylinders.

The portion of the thus cut elongated member 1 on the downstream side of the elongated member pinching section 36 which is to be a wind-terminating portion of the elongated member 1 on the spool 12 slidably passes through the pressure rolls 44 and 44' of the elongated member 36 and enters the space within the end cover 24 through the opening 24a thereof. The pressure roll 44 is returned to the original position of FIG. 31 by rotating about the axis of the pressure roll 44' for preparing the next operation of transferring the elongated member 1.

When the elongated member 1 is nearly fully wound on the spool 12' on the spooler 10', the guide pulley 40 of the elongated member shifting section 32 moves beyond the now waiting spooler 10 so that the elongated member 1 engages the spool 12 on the spooler 10 as shown in FIG. 36. Then, the pressure rolls 44 and 44' of the elongated member pinching section 36 pinch the elongated member 1 and are driven at peripheral velocity higher than the line speed of the spooler 10' and the looper 130 upwardly moves so that the slack of the elongated member 1 is absorbed thereby shown in FIGS. 36 and 37.

Thereafter, as shown in FIG. 38, the pressure roll 44 of the elongated member pinching section 36 is angularly displaced about the axis of the pressure roll 44' in a counterclockwise direction so that the elongated member 1 is wound in the form of S shape. The accumulator 38 moves to the operating position between the elongated member pinching section 36 and the spooler 10 to accumulate the elongated member 1 therein. The other operation of the apparatus is substantially identical to that aforementioned with reference to the steps of transferring the elongated member 1 from the spooler 10 to the spooler 10'.

It should be noted that with the pressure roll 44 being angularly displaced around the axis of the pressure roll 44' so that the elongated member 1 is wound in the form of S shape and with the auxiliary pressure roll 72 adapted to engage the pressure roll 44', the elongated member 1 is more positively pinched thereby than it is pinched only by the two pressure rolls 44 and 44' without one of them being angularly displaced. This effectively prevents the excessive tension applied to the elongated member 1 between the elongated member pinching section 36 and the waiting spooler from being applied to the elongated member 1 between the elongated member pinching section 36 and the operating spooler. Thus, the elongated member 1 on the spool on the spooler on which it is fully wound is neither damaged nor broken by the tension applied to the elongated member 1 caught and cut by the spooler on which the elongated member 1 begins to be wound from now.

It should be noted that since the operating spooler 10 continues to be operated until the elongated member is fully transferred to the waiting spooler, which is completed by catching and cutting the elongated member 1 thereat, the wind-terminating portion of the elongated member 1 on the downstream side of the elongated member pinching section 36 cut away from the elongated member 1 on the upstream side of the elongated member pinching section 36 which is to be wound on the waiting spooler 10' can pass through the elongated member pinching section 36 and be wound on the downstream spooler 10. This causes the operation of transferring the elongated member 1 to be more effectively made than conventional method of transferring it while the downstream spooler stops.

With the pressure roll 44 surrounded by the roll cover 86 when the elongated member 1 is cut, with the pressure roll 44' surrounded by the roll cover 122 and with the auxiliary pressure roll 72 forcing the elongated member 1 against the peripheral face of the pressure roll 44, the elongated member 1 is prevented by the roll covers 86 and 122 and the auxiliary pressure roll 72 from running widely when it slidably passes through the pressure rolls 44 and 44' after it is cut between the catching pawl 26' or 26 and the pressure roll 44. Thus, it will be noted that the elongated member 1 is more effectively prevented from being damaged and the transferring operation of the elongated member 1 can be safely made.

With the elongated member drawing section 34 and the roll cover 122 provided integrally with the accumulator rod 46' of the accumulator 38' or 38, they can move together with each other and are positioned at predetermined operation places. Thus, it will be noted that the apparatus of the invention can be more simplified than that in which they are separately provided and driven by separate drive means.

Although, in the illustrated embodiment, the accumulators 38 and 38' are used together with the elongated member pinching section 36, only the accumulators 38 and 38' may be provided without using the elongated member pinching section 36 if the elongated member 1 is of relatively high tensile strength, which requires no elongated member pinching section and/or if the elongated member is transferred between the spools having wasteful spool portions as conventional so that the elongated member can be positively caught by the spool on which it begins to be wound.

Although, in the illustrated embodiment, the auxiliary pressure roll 72 is provided to enhance the elongated member 1 to be pinched by the elongated member pinching section 36, it may be omitted if only two pressure rolls 44 and 44' can filly pinch the elongated member 1.

Furthermore, although, in the illustrated embodiment, the pressure roll 44 is angularly displaced about the axis of the pressure roll 44' so that the elongated member 1 is wound in the form of S shape around the pressure rolls 44 and 44'it may be angularly displaced not about the axis of the pressure roll 44', but about an appropriate axis extending in parallel to the axes of the pressure rolls 44 and 44'. Not only one of them but also both of them may be angularly displaced about an axis extending in parallel to them.

In the illustrated embodiment, the shifting air cylinders and the lifting air cylinders are used for shifting and lifting various members, they may be replaced by other fluid pressure cylinders such as hydraulic cylinders.

Although one preferred embodiment of the invention has ben described and illustrated with reference to the accompanying drawings, it will be understood by those skilled in the art that it is by way of example, and that various changes and modifications may be made without departing from the spirit and scope of the invention, which is intended to be defined only to the appended claims.

What is claimed is:

1. A method of successively winding an elongated member using an apparatus including at least first and second spoolers having associated first and second spools and controlled drive means for operating the elements of the apparatus comprising the steps of shifting said elongated member for transfer from said first spool when it is fully wound to said second spool, drawing said elongated member toward a catching member on said second spool on said second spooler to catch a wind-beginning end of said elongated member whereby said elongated member is transferred from said first spooler to said second spooler and stopping said first spooler after said elongated member is caught and cut by said catching member on said second spool on said second spooler and a wind-terminating portion of said elongated member is wound on said first spool on said first spooler, said method further comprising the steps of pinching said elongated member at a pinch location between said spoolers so that a tension applied to said elongated member when said elongated member is caught and cut at said second spooler is prevented from being applied to said elongated member on said first spool on said first spooler, pulling out said elongated member at a speed higher than a winding speed of said first spooler while said elongated member is pinched so that the elongated member is slackened on the downstream side of said pinch location and absorbing slack of said elongated member so that an appropriate tension is applied to said elongated member on said downstream side thereof.

2. A method of successively winding an elongated member as set forth in claim 1, and wherein said step of pinching said elongated member includes deforming said elongated member around pressure rolls while said elongated member engages peripheral portions of said pressure rolls for pinching said elongated member.

3. A method of successively winding an elongated member as, set forth in claim 1, wherein said steps of pulling out said elongated member at a speed higher than said winding speed of said first spooler member and absorbing slack also include subsequently controlling the pulling out speed to be higher than, equal to or less than the winding speed of said first spooler in accordance with the tension to be applied to the elongated member on the downstream side thereof.

4. An apparatus for successively winding an elongated member comprising at least first and second spoolers having associated first and second spools, and controlled drive means for operating the elements of the apparatus, said first spooler being operated for winding said elongated member while said second spooler is vacant and is prepared for successively winding said elongated member after it is transferred from said first spooler, said controlled drive means being arranged to stop rotation of said first spooler after said elongated member is caught and cut at said second spooler and a wind-terminating portion of said elongated member is wound on said first spool on said first spooler; and elongated member transferring means operable by said controlled drive means to transfer said elongated member from said first spooler to said second spooler; said elongated member transferring means comprising an elongated member shifting section to shift said elongated member from said first spooler to said second spooler when said elongated member is to be transferred, first and second catching members provided on said first and second spoolers, respectively, to catch a wind-beginning end of said elongated member which begins to be wound on said second spooler and from which said wind-terminating portion of said elongated member is cut away, and an elongated member drawing section to draw said elongated member toward said catching member on said second spooler when said elongated member is transferred; said elongated member transferring means further comprising an elongated member pinching section to pinch said elongated member between said spoolers so that a tension applied to said elongated member when said elongated member is caught and cut at said second spooler is prevented from being applied to said elongated member on said first spool on said first spooler, said elongated member pinching section comprising at least two oppositely rotating pressure rolls to pinch said elongated member at a pinch location between said two spoolers, said elongated member pinching section being set so that said elongated member is passed therefrom at a speed higher than a winding speed of said first spooler while said elongated member is pinched so that said elongated member is slackened on the downstream side of said elongated member pinching section, and said elongated member transferring section also including means to absorb slack of said elongated member so that an appropriate tension is applied to said elongated member in said downstream side thereof.

5. An apparatus for successively winding an elongated member as set forth in claim 4, and wherein said elongated member pinching section comprises means to angularly displace at least one of said two pressure rolls about an axis extending in parallel to axes of said pressure rolls so that said elongated member is deformed around said pressure rolls.

6. An apparatus for successively winding an elongated member as set forth in claim 5, and wherein one of said two pressure rolls is angularly displaced about an axis of the other of said two pressure rolls.

7. An apparatus for successively winding an elongated member as set forth in claim 6, wherein said elongated member is deformed in the form of an S-shape around said pressure rolls.

8. An apparatus for successively winding an elongated member comprising at least first and second spoolers and controlled drive means for operating the elements of the apparatus, said first spooler being operable for winding said elongated member while said second spooler is vacant and is prepared for successively winding said elongated member after it is transferred from said first spooler, said controlled drive means being arranged to stop rotation of said first spooler after said elongated member is caught and cut at said second spooler and a wind-terminating portion of said elongated member is wound on said first spooler; and elongated member transferring means operable by said controlled drive means to transfer said elongated member from said first spooler to said second spooler; said elongated member transferring means comprising an elongated member shifting section to shift said elongated member from said first spooler to said second spooler when said elongated member is to be transferred, catching members provided on said spoolers, respectively, to catch a wind-beginning end of said elongated member which begins to be wound on said second spooler and from which said wind-terminating portion of said elongated member is cut away, and an elongated member drawing section to draw said elongated member toward said catching member on said second spooler when said elongated member is transferred; said elongated member transferring means further comprising an elongated member pinching section to pinch said elongated member between said spoolers so that a tension applied to said elongated member when said elongated member is caught and cut at said second spooler is prevented from being applied to said elongated member on said first, spooler, said elongated member pinching section comprising at least two pressure rolls to pinch said elongated member at a pinch location between said two spoolers, said elongated member pinching section being set so that said elongated member is passed therefrom at a speed higher than a winding speed of said first spooler while said elongated member is pinched so that said elongated member is slackened on the downstream side of said elongated member pinching section, and said elongated member transferring section also including means to absorb a slack of said elongated member so that an appropriate tension is applied to said elongated member on said downstream side thereof; and an accumulator disposed between said elongated member pinching section and said second spooler so that said elongated member is accumulated therebetween, said accumulator comprising at least two accumulator members disposed on opposite sides of said elongated member and displaced relative to a longitudinal direction of said elongated member, said accumulator member on the side of said second spooler being securely held at an operating position while the other accumulator member moves normally relative to said elongated member so as to accumulate said elongated member.

9. An apparatus for successively winding an elongated member as set forth in claim 8, wherein said controlled drive means control said elongated member pinching section and means to absorb slack so that said elongated member is subsequently passed from said pinching section also at a speed higher than, equal to or less than the winding speed of said first spooler in accordance with the tension to be applied to the elongated member on the downstream side thereof.

10. An apparatus for successively winding an elongated member comprising at least first and second spoolers and controlled drive means for operating the elements of the apparatus, said first spooler being operable for winding said elongated member while said second spooler is vacant and is prepared for successively winding said elongated member after it is transferred from said first spooler, said, and controlled drive means being arranged to stop rotation of said first spooler after said elongated member is caught and cut at said second spooler and a wind-terminating portion of said elongated member is wound on said first spool on said first spooler, elongated member transferring means operable by said controlled drive means to transfer said elongated member from said first spooler to said second spooler, said elongated member transferring means comprising an elongated member shifting section to shift said elongated member from said first spooler to said second spooler when said elongated member is to be transferred, catching members provided on said spoolers, respectively, to catch a wind-beginning end of said elongated member which begins to be wound on said second spooler and from which said wind-terminating portion of said elongated member is cut away, and an elongated member drawing section to draw said elongated member toward said catching member on said second spooler when said elongated member is transferred, said elongated member transferring means further comprising an elongated member pinching section comprising at least two oppositely rotating pressure rolls to pinch said elongated member at a pinch location between said spoolers so that a tension applied to said elongated member when said elongated member is caught and cut at said second spooler is prevented from being applied to said elongated member on said first spool on said first spooler, said elongated member pinching section being set so that said elongated member is passed therefrom at a speed higher than a winding speed of said one spooler while said elongated member is pinched so that said elongated member is slackened on the downstream side of said elongated member pinching section, and said elongated member transferring section also including means to absorb a slack of said elongated member so that an appropriate tension is applied to said elongated member on said downstream side thereof, said elongated member transferring section further including an accumulator disposed between said elongated member pinching section and said second spooler so that said elongated member is accumulated therebetween.

11. An apparatus for successively winding an elongated member as set forth in claim 8 or 10, and wherein one of said two pressure rolls is angularly displaced about an axis of the other of said two pressure rolls.

12. An apparatus for successively winding an elongated member as set forth in claim 10, wherein said controlled drive means control said elongated member pinching section and means to absorb slack so that said elongated member is subsequently passed from said pinching section also at a speed higher than, equal to or less than the winding speed of said first spooler in accordance with the tension to be applied to the elongated member on the downstream side thereof.

13. An apparatus for successively winding an elongated member as sets forth in claim 12, wherein said elongated member is deformed in the form of an S-shape around said pressire rolls.

14. An apparatus for sucessively winding an elongated member as set forth in claim 11, wherein said controlled drive means control said elongated member pinching section and means to absorb slack so that said elongated member is subsequently passed from said pinching section also at a speed of said higher than, equal to or less than the winding speed of said first spooler in accordance with the tension to be applied to the elongated member on the downstream side thereof.

* * * * *

UNITED STATES PATENT AND TRADEMARK OFFICE
CERTIFICATE OF CORRECTION

PATENT NO. : 5,558,296  
DATED : September 24, 1996  
INVENTOR(S) : Sasaki et al.

Page 1 of 4

It is certified that error appears in the above-indentified patent and that said Letters Patent is hereby corrected as shown below:

On the cover page, Section [75], delete "Ichihara" and insert --Ichihara-shi--.

Column 1, line 32, insert a comma " , ", after "10'".

Column 2, line 41, delete "(4-246668)" and insert --4-246068)--.

Column 2, line 63, delete "robe" and insert --to be--.

Column 4, line 53, delete "t,o" and insert --to--.

Column 5, line 37, "wind" should read --wind- --.

Column 5, line 66, delete "wily" and insert --will--.

Column 7, line 27, delete "witch" and insert --with--.

Column 8, line 18, delete "14'respectively," and insert --14' respectively,--.

UNITED STATES PATENT AND TRADEMARK OFFICE
CERTIFICATE OF CORRECTION

PATENT NO. : 5,558,296
DATED : September 24, 1996
INVENTOR(S) : Sasaki et al.

It is certified that error appears in the above-indentified patent and that said Letters Patent is hereby corrected as shown below:

Column 9, line 22, delete "44aand" and insert --44a and--.

Column 10, line 23, after "spooler" insert --10'.--.

Column 11, line 2, delete "oil" and insert --of--.

Column 11, line 50, delete the comma after "preparing".

Column 12, line 28, delete "smiler" and insert --smaller--.

Column 15, line 2, delete the comma after "to".

Column 16, line 6, after "comprise" insert --a--.

Column 16, line 12, delete "sup,ported" and insert --supported--.

Column 16, line 50, delete "8)" and insert --28--.

Column 16, line 56, delete "6" and insert --36--.

Column 18, line 48, after "thereby" insert --as--.

Column 19, line 59, delete "filly" and insert --fully--.

UNITED STATES PATENT AND TRADEMARK OFFICE
CERTIFICATE OF CORRECTION

PATENT NO. : 5,558,296  
DATED : September 24, 1996  
INVENTOR(S) : Sasaki et al.

Page 3 of 4

It is certified that error appears in the above-indentified patent and that said Letters Patent is hereby corrected as shown below:

Column 19, line 65, delete "44'it" and insert --44' it--.

Column 20, line 51 (claim 3, line 2), delete the comma after "as".

Column 21, line 46 (claim 6, line 4), delete "of".

Column 22, line 14, (claim 8, line 31), delete the comma after --first--

Column 24, line 12 (claim 13, line 2), delete "12"and insert --11--.

Column 24, line 14 (claim 13, line 4), delete "pressire" and insert --pressure--.

Column 24, line 15 (claim 14, line 1), delete "sucessively" and insert --successively--.

Column 24, line 16 (claim 14, line 2), delete "11" and insert --4--.

Column 24, line 20, (claim 14, line 6), delete "of said".

UNITED STATES PATENT AND TRADEMARK OFFICE
CERTIFICATE OF CORRECTION

PATENT NO. : 5,558,296
DATED : September 24, 1996
INVENTOR(S) : Sasaki et al.

It is certified that error appears in the above-indentified patent and that said Letters Patent is hereby corrected as shown below:

Add the following claim 15:

--15. A method of successively winding an elongated member as set forth in claim 1, wherein said step of pinching said elongated member includes deforming said elongated member in the form of an S-shape around pressure rolls for pinching said elongated member.--

Signed and Sealed this

Twenty-fifth Day of March, 1997

BRUCE LEHMAN

*Attest:*

*Attesting Officer*     *Commissioner of Patents and Trademarks*